United States Patent [19]

Yu

[11] Patent Number: 5,506,320
[45] Date of Patent: Apr. 9, 1996

[54] REACTIVE MODIFIER OF ELASTOMERIC COMB COPOLYMER FOR THERMOSETTING RESINS AND PROCESS FOR MAKING THE SAME

[75] Inventor: Simon H. Yu, Westlake, Ohio

[73] Assignee: The B. F. Goodrich Company, Akron, Ohio

[21] Appl. No.: 87,546

[22] Filed: Jul. 6, 1993

Related U.S. Application Data

[60] Continuation-in-part of Ser. No. 960,673, Oct. 14, 1992, Pat. No. 5,225,491, which is a division of Ser. No. 895,504, Jun. 8, 1992, Pat. No. 5,177,151, which is a continuation-in-part of Ser. No. 783,944, Oct. 28, 1991, Pat. No. 5,120,790, which is a continuation-in-part of Ser. No. 638,275, Jan. 7, 1991, Pat. No. 5,061,772, which is a continuation-in-part of Ser. No. 283,422, Dec. 12, 1988, Pat. No. 4,983,689, which is a continuation-in-part of Ser. No. 46,818, May 7, 1987, Pat. No. 4,791,189.

[51] Int. Cl.$^6$ .............. C08F 220/28; C08F 220/06; C08F 220/00
[52] U.S. Cl. .............. 526/266; 526/317.1; 526/319; 526/320; 526/328; 526/328.5; 526/329.5; 526/329.6; 526/329.7; 526/329; 526/329.1; 526/329.4; 526/329.2
[58] Field of Search .............. 526/317.1, 319, 526/320, 328, 266, 328.5, 329.5, 329.6, 329.7, 329, 329.1, 329.4, 329.2

[56] References Cited

U.S. PATENT DOCUMENTS

| | | | |
|---|---|---|---|
| 3,285,949 | 11/1966 | Siebert | 528/358 |
| 3,465,058 | 9/1969 | McCarthy | 260/837 |
| 4,133,957 | 1/1979 | Riew | 544/357 |
| 4,322,328 | 3/1982 | Graetz et al. | 524/458 |
| 4,460,746 | 7/1984 | Fock et al. | 525/117 |
| 4,786,749 | 11/1988 | Koleske et al. | 560/76 |
| 5,006,582 | 4/1991 | Mancinelli | 524/271 |
| 5,017,646 | 5/1991 | Muramoto et al. | 524/807 |
| 5,116,910 | 5/1992 | Tone et al. | 525/244 |
| 5,225,470 | 7/1993 | Mancinelli | 524/271 |

FOREIGN PATENT DOCUMENTS

| | | |
|---|---|---|
| 0231038 | 1/1987 | European Pat. Off. |
| 0230330 | 1/1987 | European Pat. Off. |
| 0269187 | 11/1987 | European Pat. Off. |

*Primary Examiner*—Jeffrey Mullis
*Attorney, Agent, or Firm*—George W. Moxon, II

[57] ABSTRACT

A reactive polymeric modifier to improve toughness and/or flexibility of thermosetting resins where the polymer has a comb configuration including a saturated polymeric backbone having reactive groups at each end and at least one pendent chain which is miscible with the thermosetting resin while it is uncured; the backbone being a polymeric chain of carbon-carbon linkages free of olefinic unsaturation, having a glass transition temperature Tg in the range from −100° C. to 25° C.;

the reactive groups being reactive with the thermosetting resin, being positioned on both ends of the backbone, and comprising, on average, at least 1.2 but less than 2 reactive groups positioned so as to yield a substantially difunctionalized comb;

the pendent chain or chains being linked to said backbone, being present in an amount in the range from 3% to 40% by weight of said comb copolymer, and having from 2 to 250 repeating units selected from the group consisting of polyester, polyether, polystyrene, and polymethacrylate; and, the comb polymer having a number average molecular weight in the range from 1,000 to 20,000, and a process for making the modifier.

28 Claims, No Drawings

REACTIVE MODIFIER OF ELASTOMERIC COMB COPOLYMER FOR THERMOSETTING RESINS AND PROCESS FOR MAKING THE SAME

BACKGROUND OF THE INVENTION

This application is a continuation-in-part application of Ser. No. 960,673, filed Oct. 14, 1992, issued as U.S. Pat. No. 5,225,491, which is a division of Ser. No. 895,504, filed Jun. 8, 1992, issued as U.S. Pat. No. 5,177,151, which is a continuation-in-part application of Ser. No. 783,944, filed Oct. 28, 1991, issued as U.S. Pat. No. 5,120,790, which is a continuation-in-part application of Ser. No. 638,275, filed Jan. 7, 1991, issued as U.S. Pat. No. 5,061,772, which is a continuation-in-part application of Ser. No. 283,422, filed Dec. 12, 1988, issued as U.S. Pat. No. 4,983,689, which is a continuation-in-part of Ser. No. 046,818, filed May 7, 1987, issued as U.S. Pat. No. 4,791,189 on Dec. 13, 1988.

This invention relates to a comb copolymer having a saturated polymeric backbone with carbon-carbon (C-C) linkages and pendent chains which provide miscibility in a thermosetting resin, for example, polyester such as polycaprolactone, or a polyether, such as polyepichlorohydrin; and, the backbone has terminal functional groups, for example carboxyl-functional groups, as a result of a free-radical polymerization with, for example, 4,4'-azobis-4-cyanovaleric acid (also commonly referred to as azodicyanovaleric acid) or ADVA. The term a polymeric backbone with carbon-carbon (C-C) linkages or a C-C backbone, means a backbone of a polymer with repeating units containing no atom other than carbon atom in the backbone linkages.

The comb copolymer is used as a reactive modifier to improve the toughness or flexibility of a thermosetting resin (hereafter "thermoset" for brevity). By the term "reactive modifier" we refer to a relatively low molecular weight ("mol wt") elastomeric polymer which possesses terminal functional groups reactive with the uncured target thermoset and functions either as a toughening agent or toughener ("TA"), and/or, a flexibilizing agent or flexibilizer ("FA"). By "toughened" it is meant that the area under the stress-strain curve and the fracture energy are significantly increased without substantially decreasing the glass transition temperature (Tg), the modulus, or diminishing other desirable mechanical properties of the material; stated differently, upon being toughened, a material which is inherently brittle has the ability to absorb more energy without rupture than it could before it was toughened. It is known that TAs found to be effective in a thermoplastic substrate do not exhibit the same effect in a thermoset. Quantitatively, a material is "flexibilized" when the area under the stress-strain curve is increased, but with both, loss of modulus, and decrease in Tg, and likely, also other mechanical properties.

It is known that desirable toughness in a thermoset is most preferably imparted by an elastomeric modifier, which, (1) has reactive functional groups, (2) is miscible in the thermoset before curing, and (3) precipitates and forms a uniformly distributed elastomeric microphase in the thermoset matrix as the molecular weight of the thermoset increases. The microphase desirably has small particle size, generally smaller than 25 μm, and high interfacial bond strength between the microphase and the matrix. The size and size distribution of elastomeric microparticles are partially dependent on the curing kinetics—the cure schedule, type and reactivity of the curing agent, and cure chemistry involved. The most influential factor is the miscibility between the thermoset and the reactive modifier. Since the miscibility not only affects the size and size distribution of the microphase of the elastomer but also the interfacial bond strength between the matrix and the microparticles. If miscibility is too good, microphase separation will not occur. It will causes severe plasticization and the reactive modifier functions as a flexibilizer. On the other hand, if miscibility is poor, it causes macroscopic demixing of the elastomer modifier before curing or the formation of undesirable macrophase separation such as in the systems of epoxy resins with carboxyl-terminated polybutadiene or carboxyl-terminated polyacrylates.

To meet the foregoing, it is desirable that the TA or FA be substantially difunctionalized so that at least one, and preferably both ends of each additive molecule are reacted with a thermoset upon curing. It is generally believed that difunctionality of these reactive elastomers is essential to achieve desirable toughening. This thinking is typified by U.S. Pat. Nos. 3,285,949 and 3,823,107, and the articles "Toughening of Epoxy Resin by an Elastomeric Second Phase" by F. J. McGarry and A. M. Willner, in Massachusetts Institute of Technology, R68-8, March, 1968 and "The Chemistry of Rubber Toughened Epoxy Resin I." by A. R. Siebert and C. K. Riew in 161th ACS National Meeting, Org. Coating Div., March, 1971. The term "substantially difunctionalized" is used to acknowledge that, from a practical viewpoint, one cannot make, on average, a theoretically fully difunctional polymer by a free-radical polymerization. Therefore the term "substantially difunctionalized" is used to refer to a molecule which has at least 1.2, but, on average less than 2 terminal functional groups at or near the ends of a molecule.

CTBN polymers (Carboxyl-terminated copolymers of butadiene and acrylonitrile) are the most widely used reactive modifier for thermosets and commercialized under a trade name of Hycar® reactive polymers by B.F. Goodrich Co. CTBN polymers are produced by a free radical solution polymerization using a functional azo initiator, such as ADVA [4,4'-azobis(4-cyano-pentanoic acid)], as disclosed by Siebert in U.S. Pat. No. 3,285,949. The CTBN polymers are 'fixed' in the matrix of thermosetting resins upon curing because the terminal carboxyl (COOH) groups of the copolymers are reactive with the functional groups of the thermosetting resin, such as the oxirane end groups of an epoxy resin, diglycidyl ether of bisphenol A ("DGEBA"). In these linear straight-chain configurations, the immiscible butadiene homopolymer is modified by incorporating polar acrylonitrile to provide desirable miscibility of the reactive modifier with the target thermoset and enable the formation of the favorable microphase morphology in the cured thermoset to provide toughness.

However, CTBN polymers are known to be inherently susceptible to ultra-violet light and thermo-oxidative degradation due to the presence of double bonds of the butadiene repeating units. CTA polymers (Carboxyl-terminated acrylate polymers), which are free of olefinic unsaturation, made in a manner analogous to CTBN polymers as disclosed by McCarthy in U.S. Pat. No. 3,465,058, are the ideal choice. But CTA polymers are not optimumized tougheners. The acrylate polymer has extremely poor miscibility with nearly all thermosetting resins and is not able to form favorable microphase morphology upon curing to provide toughness.

Attempts have been made to improve the miscibility of reactive acrylic polymers as exemplified by the publication "An Alternative Liquid Rubber for Epoxy Resin Toughening—Improving Poly(n-butyl acrylate) Rubber-Epoxy Compatibility by Using of Acrylonitrile and Acrylic Acid Copolymers and Terpolymers", Kirshenbaum et al., in Adv. in Chem. Series 208: Rubber-Modified Thermoset Resins, C. K. Riew ed., Ch 11, p. 163, 1984. The studies have found that the miscibility of acrylic polymer with epoxy resin (Epon 828) is significantly improved by incorporation of a polar monomer, such as acrylonitrile or acrylic acid. However, the impact strength improvement is insignificant at best. Consequently, a reactive polymer having miscibility with a thermoset may not perform as an effective toughener.

European patent applications 87202352.8 and 87200021.1 to Muramoto et al, published as 0,269,187 A2 and 0,231,038 disclose comb copolymers having no terminal functional groups at opposite ends of their saturated carbon-carbon backbones, but the pendent chains have reactive functional groups. Muramoto et al then copolymerized the macromer with a monomer having $\alpha,\beta$ unsaturation using (based upon the examples) less than 1 part by weight or 0.4 part by mole of ADVA neutralized with an alkali in deionized water to effect the emulsion polymerization of methyl methacrylate (MMA) and n-butyl acrylate (nBA) see example 15, of the '187 specification. Neutralized ADVA was used only to provide the needed water soluble initiator, and to make a conventional MMA-nBA copolymer in a conventional emulsion polymerization, using a conventional water soluble initiator, except for using no conventional surfactant.

This invention provides a reactive comb-shaped modifier for a thermoset, wherein the pendent chain or chains provides desirable miscibility of the modifier in the thermoset. The miscibility and reactive terminal groups of the reactive modifier of the present invention provide unexpected toughness and/or flexibility to the thermoset being modified.

SUMMARY OF THE INVENTION

The present invention has resulted from the discovery of a novel reactive polymeric modifier to improve toughness and/or flexibility of a thermosetting resin possessing substantially difunctionalized reactive groups at both ends of the toughening polymer chain and having a comb-shaped or "comb" structure having a backbone of an elastomeric acrylic chain and a pendent chain or chains which are miscible with thermosetting resin to be modified. Particularly useful are pendent chain(s) having repeating units in the range from 2 to 500 and being present in the range from 3% to 40% by weight of said comb-shaped copolymer. The choice of an appropriate repeating unit of the pendent chain, ensures that the modifier is miscible with the thermosetting resin before curing, to function as an effective toughener and/or flexibilizer.

The terminal functional groups of the modifier are reactive with the uncured thermosetting resin, and could be carboxyl, hydroxyl, amino, epoxy, vinyl or thio. The present invention provides a reactive comb having a predominant backbone of polyacrylate having at least 1.2 but less than 2 functional groups at the ends of the backbone.

The fact that the backbone of the elastomeric acrylic chain is free of olefinic unsaturation means that the reactive modifier is highly resistant to ultraviolet light and thermo-oxidative degradation.

It has been further discovered that the elastomeric, telechelic, reactive comb-shaped ("comb") copolymer having a desirably low numerical average molecular weight (Mn) in the range from 1,000 to 20,000, a backbone containing enough elastomeric monomer or "E-monomer" to imbue the backbone with elastomeric properties, and pendent chains derived from a suitable macromer, can be reproducibly produced in a free radical polymerization using a difunctional initiator which contributes its functional groups to the terminal ends of the backbone, as it forms. The result is the direct formation of the reactive comb with terminal carboxyl or hydroxyl end groups, although these can readily be converted to epoxy, amino, vinyl and thio end groups.

The comb can be made in excellent yields in a process comprising reacting an $\alpha,\beta$-unsaturated macromonomer with at least one ethylenically unsaturated monomer, in a non-aqueous solvent, in the presence of an initiator which generates necessary free radicals, and is present in an amount at least sufficient to introduce desired reactive groups at the terminal ends of the backbone. Such a comb, if free from olefinic unsaturation in either its backbone or its pendent chains, is highly stable to degradation by actinic radiation, such as is experienced outdoors, in bright sunlight. It is also highly resistant to thermal-oxidative degradation and can be used in applications at higher service temperatures. In those instances where such degradations are not a consideration, it may be desirable to use a backbone containing some or all monomers, in each repeating unit of which at last some unsaturation remains.

The modifiers of this invention can provide a reactive comb for use as a toughener and/or a flexibilizer reactive with one or more uncured thermosetting resins, such as acrylic resin, polyester resin, polyurethane resin, epoxy resin, vinyl ester resin, and unsaturated polyester resin, the reactive comb having miscibility with the uncured thermosetting resin because of the presence of the pendant chain or chains evidenced by the formation of a single phase with the uncured resin at a temperature in the range from 20° C. to 200° C., and homogeneously distributed therein. When the resin starts to be cured and build up its molecular weight, the reacted comb would be precipitated out prior to gelation. The elastomeric comb is precipitated as the disperse microphase in a continuous phase of the cured resin matrix, and the reacted comb is substantially homogeneously distributed throughout the matrix resin to provide toughness. On the other hand, when the reactive comb is served as a flexibilizer, no precipitation of the reacted comb or formation of a microphase is occurred.

An alternative method for making the comb copolymer comprises starting a free radical copolymerization of "E-monomer" and a difunctional monomer or "D-monomer", optionally in combination with a third rigid monomer or "R-monomer", with a difunctional initiator to provide terminal reactive groups for the copolymer. The copolymer has an elastomeric backbone of acrylic chain possessing reactive functional groups at both end derived from the initiator and pendent reactive functional groups randomly distributed along the backbone from "D-monomer". The comb copolymer is subsequently made by coupling the pendent reactive groups of "D-monomer" with a mono- or difunctional oligomer having repeating units which are miscible with the targeted thermosetting resin. The oligomer is selected from the group of polyester, polystyrene, polyether or polymethacrylate.

DETAILED DESCRIPTION OF PREFERRED EMBODIMENTS

The reactive polymeric modifier of the present invention possessing reactive functional groups at both ends of the toughening polymer chain and a comb-shaped or "comb"

structure having a backbone of an elastomeric hydrocarbon chain and pendent chains which are miscible with the thermosetting resin to be modified. The reactive modifier has a number average molecular weight (Mn) in the range from 1,000 to 20,000, preferably in the range from 1,500 to 10,000, most preferably in the range from 2,500 to 6,000, and on average, at least 1.2 but less than 2.0 reactive functional groups positioned at said backbone's ends. The functional groups at both ends of the polymer chain in the said reactive modifier are reactive with the functional groups of the uncured thermosetting resin and selected from group consisting of carboxyl, hydroxyl, amino, epoxy, vinyl, and thio group. The elastomeric carbon-carbon backbone linkages of the said reactive modifier has a glass transition temperature Tg in the range from −100° C. to 25° C. and is derived from free radical polymerization of one or more ethylenically unsaturated monomers, preferably free of olefinic unsaturation, most preferably acrylic homopolymers or copolymers. Particularly useful is the pendent chain or chains of the said reactive modifier having repeating units in the range from 2 to 250, preferably in the range from 2 to 100, most preferably in the rang from 3 to 25 and being present in the range from 3% to 40% by weight of said comb-shaped copolymer, preferably in the range from 5% to 25% by weight, and being selected from the group consisting of polyester, polyether, polystyrene, and polymethacrylate. The appropriate choice of repeating unit of the pendent chain, ensures that the modifier is miscible with the thermosetting resin before curing and functions as an effective toughener and/or flexibilizer.

The elastomeric, telechelic, reactive comb-shaped ("comb") copolymer of this invention can be produced in a free radical polymerization, comprising, copolymerizing at least one α,β-unsaturated monomer in the range from 97% to 60% by weight, preferable in the range from 95% to 75% by weight, with a macromer of polyester, polyether, polystyrene or polymethacrylate possessing a free radical polymerizable acrylic, allylic or styrylic head group, which may be grouped individually or in combination, in the range from 3% to 40% by weight, preferable in the range from 95% to 75% by weight, having repeating units in the range from 2 to about 250, preferably 2 to 100, in a substantially non-aqueous solvent, in the presence of in the range from 2 to 25 moles of a difunctional initiator per 100 moles of monomers used, at a temperature in the range from 10° C. to about 150° C., depending upon the half-life of the initiator used. By "substantially non-aqueous" is meant that less than 10 parts of water are present per 100 parts of diluent mass. The initiator contributes its functional groups to the terminal ends of the backbone of the comb copolymer, as it forms. The result is the direct formation of the reactive comb with terminal carboxyl, hydroxyl, epoxy, and thio end groups derived from the initiator with a corresponding functional group. Each of the foregoing groups may be introduced, with varying degrees of success, by either an azo compound or an organic peroxide. It may be desirable, in some cases, that the reactive terminal carboxyl or hydroxyl groups of the comb copolymer are obtained by hydrolyzing the terminal functional groups of the resulting copolymer made with an initiator having easily hydrolyzable alkyl ester or trialkylsilyoxy groups, respectively. The resulting reactive comb-shaped modifier has the following structure:

$$R^e—X—Q—X—R^e \qquad (I)$$

wherein, "$R^e$—X—" is either directly derived from the difunctional initiator, preferably an azo compound or an organic peroxide, or obtained by hydrolyzing the group directly derived from the difunctional initiator having easily hydrolyzable alkyl ester or trialkysilyloxy group after the comb copolymer is made, Re is a reactive functional group which can be carboxyl, hydroxyl, epoxy, or thio groups, although these could be converted to amino or vinyl as will be described hereinafter, X is a residual group which depends upon the initiator employed and Q represents the comb-shaped copolymer without its terminal functional groups having the backbone with pendent chains of the following structure:

$$—[R]_{n'}—[M_o]_{n''}— \qquad (II)$$
$$\phantom{—[R]_{n'}—}|$$
$$\phantom{—[R]_{n'}—}[M]_n—Z$$

wherein $[M_o]_{n''}$ represents the elastomeric carbon-carbon backbone component of the comb-shaped copolymer derived from free radical polymerization of one or more ethylenically unsaturated monomers represented by Mo, $[M_o]$ represents the repeating unit of one or more ethylenically unsaturated monomers, and the backbone comprising linked repeating units of at least (i) one E-monomer, and optionally (ii) either a R-monomer, or (iii) a D-monomer, or both; (i), (ii) and (iii) together, and consisting essentially of (i) from 70%– 100% by wt of the backbone, of at least one E-monomer in combination with (ii) from 0–30% by wt of a R-monomer, and, (iii) 0–10% by wt of a difunctional monomer having α,β-olefinical unsaturation;

$$[R]_{n'}$$
$$|$$
$$[M]_m—Z$$

represents the repeating units of the graft component of the comb-shaped copolymer derived from free radical polymerization of a macromer of polylactone, polyether, polystyrene, or polymethacrylate, said the macromer is represented by the general structure:

$$R—[M]_m—Z \qquad (LM)$$

wherein R represents a mono-olefinically unsaturated group selected from the following:

(A) an acrylic or methacrylic group wherein the ethylenically unsaturation is adjacent to a carbonyl group, (B) a styrylically unsaturated group wherein the ethylenical unsaturation is adjacent to an aromatic ring, and, (C) an allylically unsaturated group;

[M] represents repeating unit of a polylactone, polyether, polystyrene, or polymethacrylate, m represents an integer in the range from 2 to about 250, preferably in the range from 2 to 100, most preferably in the rang from 3 to 25; polyether, polystyrene, or polymethacrylate, m represents an integer in the range from 2 to about 250, preferably in the range from 2 to 100, most preferably in the rang from 3 to 25;

Z is a terminal group selected from the group consisting of —OR$^1$, —OOCR$^1$, —NHOCR$^1$, —OOCR$^2$COOH, —OSiR$_3^1$, —OCH$_2$CH$_2$CN, —OSO$_3$Na, —OSO$_3$K, —OSO$_3$Li, —OSO$_3$NH$_4$, —OSO$_3$H, —R$^1$, and —H, wherein R$^1$ is selected from the group consisting of C$_1$–C$_{20}$ alkyl, alkoxyalkyl, and haloalkyl, and C$_6$–C$_{20}$ aryl and aralkyl; and, R$^2$ is a divalent C$_1$–C$_{10}$ aliphatic, alicyclic, or aromatic hydrocarbon linkage;

n' represents an integer in the range from 1 to 30, preferably in the range from 1 to 15, most preferably in the rang from 2 to 10 and refers to the number of repeating units of a macromer of the graft component; and n" represents an integer in the range from 12 to 500, preferably in the range from 25 to 250, most preferably in the range from 20 to 150 and refers to the number of repeating units of one or more ethylenically unsaturated monomers of the backbone component;

wherein the sum of n'+n' is such that the molecular weight Mn of the reactive comb-shaped copolymer is at least 1,000 and no greater than 20,000, preferably from 1,500 to 10,000, most preferably from 3,000 to 6,000; and, the ratio of n'/n" is chosen to provide the macromer in an amount in the range from 3 to 40 wt % of the total comb-shaped copolymer, preferably in the range from 5% to 25% by weight.

The free-radical initiator capable to derive functional groups directly to both ends of the comb-shaped copolymer of (I) is a difunctional azo compound selected from the group consisting of 4,4'-azobis-(4-cyano-pentanoic acid), 4,4'-azobis-(4-cyano-2-methylpentanoic acid), 2,2'-azobis-(2-cyano-pentanoic acid), 2,2'-azobis-(4-cyano-pentanoic acid), 2,2'-azobis-(2-methylpropanic acid), 2,2'-azobis-[2-(hydroxymethyl) propionitrile], 2,2'-azobis-{2-methyl-N-[ 1,1-bis(hydroxymethyl)]-2-hydroxyethyl] propionamide}. The preferable azo initiators are 4,4'-azobis-(4-cyano-pentanoic acid) (ADVA) and 2,2'-azobis-[2-(hydroxymethyl) propionitrile].

The free-radical initiator capable of providing functional groups after hydrolysis is a difunctional azo compound selected from the group consisting of dimethyl 4,4'-azobis-(4-cyano-pentanate), diacetate ester of 2,2'-azobis-(4-methyl-2-pentanol), diacetate ester of 2,2'-azobis-(2-methyl-2-propanol), dimethyl 2,2'-azobis-( 2-methypropionate), diacetate ester of 2,2'-azobis-[2-(hydroxymethyl) propionitrile], 2,2'-azobis-[2-(trimethylsilyloxymethyl) propionitrile], and dimethyl 2,2'-azobis-(2-methylpropinate)- When 4,4'-azobis-( 4-cyano-pentanoic acid) or dimethyl 4,4'-azobis-(4-cyanopentanate) (after hydrolysis) is used as an initiator, the —X—$R^e$ of the comb (I) is

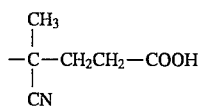

wherein, the reactive terminal functional group $R^e$ is COOH. When 2,2'-azobis-[2-(hydroxymethyl) propionitrile] or 2,2'-azobis-[2-(trimethylsilyloxymethyl) propionitrile] (after hydrolysis) is used as an initiator, the—X—$R^e$ of the comb (1) is

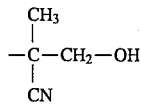

wherein, the reactive terminal functional group Re is OH.

Another free-radical initiator capable of providing functional groups directly to both ends of the comb-shaped copolymer of (I) is a difunctional organic peroxide selected from the group consisting of diacyl and dialkyl peroxides, peroxydicarbonates, and peroxyketals containing functional groups consisting of carboxyl, hydroxyl, epoxy, and thio groups at both ends of the molecule.

Another free-radical initiator capable of providing hydroxyl functional groups directly to both ends of the comb-shaped copolymer of (I) is hydrogen peroxide.

The elastomeric backbone of comb copolymer (1) comprises repeating units derived from one or more ethylenically unsaturated monomers, Mo, representing an E-monomer alone; or in combination, an E-monomer with an R-monomer and/or a D-monomer; wherein the E-monomer provides the elasticity, is present at 65%–100% by weight of the backbone of the comb copolymer, and is consisting of:

(i) esters of acrylic acid with $C_2$–$C_{18}$ alcohols including alkoxyl and halogen derivatives thereof, such as ethyl acrylate, propyl acrylate, butyl acrylate, hexyl acrylate, 2-ethylbutyl acrylate, 2-ethylhexyl acrylate, dodecyl acrylate, octadecyl acrylate, ethoxyethyl acrylate, ethoxypropyl acrylate, ethoxybutyl acrylate, methoxyethyl acrylate, methoxypropyl acrylate, methoxybutyl acrylate, 2-(2-ethoxyethoxy) ethyl acrylate, 2,2'2-trifluoroethyl acrylate;

(ii) $C_2$–$C_6$ α-olefins, such as ethylene, propylene, and butylene;

(iii) $C_4$–$C_5$ dienes, such as butadiene, isoprene, and chloroprene;

(iv) vinyl $C_1$–$C_8$ alkyl ethers, such as vinyl ethyl ether, vinyl propyl ether, vinyl butyl ether, and vinyl ethylhexyl ether; wherein the R-monomer provides rigidity, lower cost and/or compatibility, is present at 0%–30% by weight of the backbone of the comb copolymer, and is consisting of:

(i) $C_1$–$C_4$ alkyl methacrylate, such as ethyl methacrylate, propyl methacrylate, butyl,methacrylate, and methyl methacrylate;

(ii) $C_8$–$C_{12}$ styrene and e-methylstyrene, including halogenated derivatives thereof, such as styrene, alpha-methylstyrene, chlorostyrene, vinyl toluene;

(iii) acrylonitrile and methacrylonitrile; and (iv) vinyl chloride, vinyl acetate, vinylidene chloride, vinyl pyridine, and vinyl pyrrolidone; wherein the D-monomer provides an additional reactive functional group to the comb at the pendent positions, is an ethylenically unsaturated monomer having an additional functional group selected from the group consisting of carboxyl, hydroxyl, epoxy, isocyanato, and thio, is present at 0%–10% by weight of the backbone of the comb copolymer, and is consisting of:

(i) hydroxyl containing hydroxy $C_2$–$C_4$ alkyl (meth)acrylate, where "(meth)acrylate" indicates either an acrylate or a methacrylate, such as 2-hydroxyethyl (meth)acrylate, hydroxypropyl (meth)acrylate, 4-hydroxybutyl (meth)acrylate, and 2,3-dihydroxypropyl (meth)acrylate;

(ii) epoxy containing glycidyl (meth)acrylate and allyl glycidyl ether;

(iii) thio containing thio $C_2$–$C_4$ alkyl (meth)acrylate, such as 2-thioethyl (meth)acrylate, thiopropyl (meth)acrylate, 4-thiobutyl (meth)acrylate, 2,3-dithiopropyl (meth)acrylate;

(iv) hydroxyl containing styrene, such as o,p-hydroxystyrene and o,p-hydroxystyrene with non-reactive ring substituents;

(v) isocyanato containing 2-isocyanatoethyl (meth)acrylate; and, (vi) acid containing (meth)acrylic acid and its dimer.

In the preferred embodiment of this invention, the comb is a copolymer of the chosen macromer and one or more ethylenical monomers for the backbone selected from (i) ethyl acrylate, butyl acrylate, ethylhexyl acrylate, and mixture of two or all, optionally, with 0–10 wt % of a D-monomer; or, (ii) butadiene and mixture of butadiene and acrylonitrile. When a mixture of ethyl acrylate, butyl acrylate, and acrylic acid is selected in (i), the —[$M_o$]$_{n''}$— of (II) is consisted of repeating units of

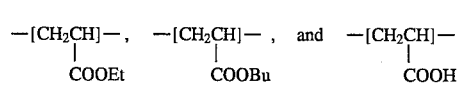

randomly distributed, and when a mixture is selected in (ii), the —[$M_o$]$_{n''}$— of (II) is consisted of repeating units of

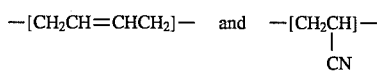 and —[CH$_2$CH]—
                        |
                        CN randomly distributed.

In the best mode, and most preferred embodiment of this invention, the backbone is a copolymer of the chosen macromer and ethyl acrylate, butyl acrylate, ethylhexyl acrylate, or mixture of two or all for an ultra-violet and thermo-oxidative resistant comb.

The macromer of (LM) is selected from the group of polyester, polyether, polystyrene or polymethacrylate. The macromers of polyester are made by ring-opening polymerization of at least one lactone as described in U.S. Pat. Nos. 4,791,189, 4,983,689, 3,655,631, 4,188,472, 4,368,320, 4,504,635, and 4,683,287. The disclosures of which are incorporated by reference thereto as if fully set forth herein. The preferred chains may be of a (i) homopolymer of lactone, (ii) random copolymer of at least one lactone, or, (iii) block copolymer of lactone-b-ether, or, of ether-b-lactone, provided the comb is made by the afore-described solution polymerization process. The lactone is selected from a three to seven member-ring cyclic monomer such as epsilon-caprolactone, delta-caprolactone, beta-propiolactone, beta-butyrolactone, and delta-valerolactone, and most preferably, epsilon-caprolactone. Also usable are lactones having equal or more than eight-member ring, such as zeta-enantholactone and eta-capryllactone, but they are less favorable. The macromers of polyesters are also made by a coupling reaction as described in U.S. Pat. Nos 4,281,172, 4,340,497, and 4,632,975. An example of a macromer of polycarprolactone made by ring-opening polymerization has a structure of

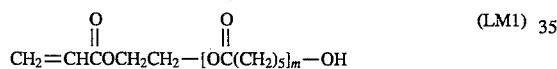 (LM1)

wherein m is an integer in the range from 2 to 250.

The macromers of polyethers are made by ring opening polymerization of at least one cyclic ether as described in U.S. Pat. Nos. 4,680,358, 4,722,978, and Re. 31,468. The disclosures of which are incorporated by reference thereto as if fully set forth herein. The preferred chains may be of a homopolymer or random or block copolymer of polyether made from cyclic ether(s) selected from propylene oxide, butylene oxide, oxetane, tetrahydrofuran, epichlorohydrin, epibromohydrin, ethyl glycidyl ether, propyl glycidyl ether, butyl glycidyl ether, ethylhexyl glycidyl ether. In random or block copolymer, other cyclic ethers may be incorporated in a minor amount. The macromers of polyethers may also be made by coupling reaction in a manner as described in U.S. Pat. Nos 4,281,172, 4,340,497, and 4,632,975. An example of a macromer of polyepichlorohydrin made by ring-opening polymerization has a structure of

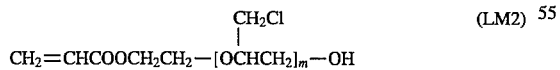 (LM2)

wherein m is an integer in the range from 2 to 250.

The macromers of polystyrene are made by anionic polymerization of at least one α,β-unsaturated aromatic monomer followed by end capping the living polymer to introduce an α,β-unsaturated terminal group as described in U.S. Pat. Nos. 3,842,059 and 3,862,098. The disclosures of which are incorporated by reference thereto as if fully set forth herein. The preferred chains may be of a homopolymer or random or block copolymer of polystyrene made from α,β-unsaturated aromatic monomer(s) selected from styrene, alpha-methyl styrene, and vinyl toluene. In random or block copolymer, other α,β-unsaturated monomers may be incorporated in a minor amount. An example of a macromer of polystyrene made by anionic polymerization with butyl lithium has a structure of

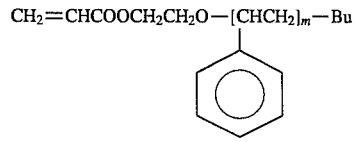

wherein m is an integer in the range from 2 to 250.

The macromers of polymethacrylate are made by group transfer polymerization of at least one alkyl methacrylate as described in U.S. Pat. Nos. 4,554,324 and 4,551,388. The disclosures of which are incorporated by reference thereto as if fully set forth herein. The preferred chains may be of a homopolymer or random or block copolymer of polymethacrylate made from alkyl methacrylate(s) selected from methyl methacrylate and butyl methacrylate.

The macromers of polyesters and polyethers made by ring-opening polymerization generally are terminated with a hydroxyl group at one end as shown in structure (LM1) and (LM2). In some cases, it is highly desirable to cap the hydroxyl group with a non-reactive group so that the new terminal group will not react with the reactive functional groups of the comb, or interfere with the subsequent conversion of the reactive groups of the comb into other groups or the utilization of the comb as a reactive modifier, or convert the hydroxyl group into another reactive group so that the new reactive group the macromer may be used as additional reactive site for the comb to react with the thermoset when the comb is used as a reactive modifier. The end-capping and the conversion of the hydroxyl group of the macromers is not narrowly critical and a variety of esterification and etherification reactions may be used to cap the terminal hydroxyl group, as for example, disclosed in U.S. Pat. Nos. 2,998,409 and 3,507,927; or, by reacting with an alkylisocyanate or, by reacting with diazomethane or, by reacting with acrylonitrile or trialkychlorosilane. The conversion of the hydroxyl group of the macromers into carboxyl group is disclosed in U.S. Pat. No 4,786,749.

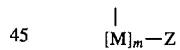

of the comb is

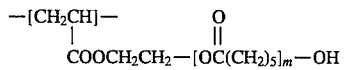

wherein, $[R]_n$, is

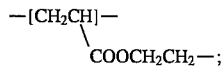

$[M]_m$ is

and,

Z is —OH.

The molecular weight of the copolymer made by the foregoing free-radical polymerization is highly dependent on the amount of the initiator used. It is generally believed that the possession of terminal reactive functional groups is one of important factors for an elastomer to be an effective modifier. The terminal functional group enables the modifier to build up its own molecular weight and to form chemical bonding between a reactive modifier and a thermoset. The build up the molecular weight of the microphase of the modifier to promote its elastomeric properties and the formation of bonding to provide a high interfacial interaction between the microphase and the thermoset matrix. Both are important for toughening. However, a relatively high molecular weight reactive modifier is less desirable or not effective since it provides less reactive functional groups per weight of the modifier or not enough functional groups to react with the thermoset to achieve the necessary interaction. Another disadvantage of high molecular weight is the difficulty in handling as a modifier. Generally most thermosets are a pourable liquid, a very high molecular weight modifier with Mn probably greater than 80,000 may be a in handling as a modifier. Generally most thermosets are a pourable liquid, a very high molecular weight modifier with Mn probably greater than 80,000 may be a solid which is difficult to dissolve into the resin; and, Mn in the range near 30,000 is either a sticky gum which is extremely difficult to handle or a liquid with extremely high viscosity, which is non-plurable. Even if the difficulty of handling the high molecular weight modifier is solved, the uncured thermoset, after blending in with the modifier, may have to high of a viscosity to be castable or to be handle which severely limits its applications. Consequently, the molecular weight of the reactive comb of the present invention is in the range from 1,000 to 20,000, preferably from 1,500 to 10,000, most preferably from 3,000 to 6,000. In order to obtain the molecular weight in a desirable range, the amounts of the initiator to be used in the polymerization is in the range from 1 to 20 part by mole per 100 part by moles of monomer(s) and macromer, preferably from 2 to 10. The reactive comb made with a initiator less than 1 part by mole per 100 part by moles of monomer(s) and macromer does not provide enough reactive groups per weight of the modifier and its viscosity is too high for most applications.

It is also generally believed that a reactive modifier shall be an elastomer. Consequently, the elastomeric backbone is a predominate component of the comb copolymer and present in the range from 60% to 93% by weight of the comb copolymer, preferably from 75% to 95 wt % by weight; the pendent chain or chains from a macromer are minor component and present in the range from 3% to 40% by weight of the comb copolymer, preferably from 5% to 25% by weight.

The E-monomer is a major component for the elastomeric backbone and is present in the range from 65% to 100% by weight of the backbone component so as to provide an elastomeric backbone component having a glass transition temperature, Tg, in the range from $-100°$ C. to $25°$ C., preferably, from $-80°$ C. to $0°$ C. If the backbone component is not compatible with the pendent chains of the comb copolymer, It will show its own Tg separately from the Tg of the pendent chains. If both Tg's are not separable because of total miscibility of the two, the Tg of the backbone component is quantified by making a similarly (as the comb) terminally functionalized homopolymer or copolymer of the ethylenically unsaturated monomer used to provide the backbone in the absence of a macromer. The molecular weight of the homopolymer or copolymer is substantially the same molecular weight as that made, or expected to be made, in the backbone. The Tg of the homopolymer or copolymer is then measured. The preferable E-monomer is a C1–C8 alkyl acrylate which is not expensive and provides very favorable polymerization with a free-radical initiator. The comb copolymer made is free of olefinical unsaturation and can be used as a modifier for applications requiring ultra-violet and thermo-oxidative resistance.

The elastomeric backbone component may be optionally consisting of from 0% to 30 wt % of a R-monomer and from 0% to 10 wt % of a D-monomer by weight of the backbone component. The R-monomer is incorporated to lower cost, to decrease the elasticity of the backbone to improve the handling of the comb copolymer, such as to decrease stickiness of the resulting comb copolymer, and/or to improve the miscibility of the backbone component with a thermoset so less pendent chains are required. Generally, the incorporation of a R-monomer will increase the Tg of the backbone component, therefore the amount of the R-monomer incorporated shall be limited so as the Tg of the backbone component will not be higher than $25°$ C. In the preferred embodiment, no R-monomer is used with at least one E-monomer of alkyl acrylate. When E-monomer is a diene, it is preferable to copolymerize with 5% to 25% by weight of a R-monomer of acrylonitrile.

A D-monomer may be incorporated to provide additional reactive functional groups randomly distributed along the backbone of the comb copolymer to react with a thermoset. Additional functional groups may be desirable to improve the interfacial interaction through additional bonding with a thermoset. However, too much bonding may not be favorable because it forms a highly crosslinked microphase which losses elasticity cannot function as a toughener. The functionality of D-monomer may be different from that of the terminal functional group so as to provide different reactivity toward a thermoset. A D-monomer may also be incorporated for the purposes to improve the miscibility of the backbone component with a thermoset so as less pendent chains are required or, in a few rare cases, to provide functional groups so as the resulting comb copolymer may be further modified before using. It is very important to select an appropriate D-monomer so that its functional group does not have significant reactivity with the terminal functional groups of the comb so as a premature reaction between them will not occur or, if does occur, will not be significant before using as a modifier. If different functionality between the terminal groups and the functional group of a D-monomer is desirable, when the terminal groups of the backbone are carboxyl, a D-monomer with functionality of hydroxyl, epoxy, or thio may be selected. The reaction between them is so low at ambient temperature, so as no significant increase in viscosity is observed for days, or even for months. When the terminal groups are hydroxyl, a D-monomer with functionality of carboxyl, epoxy, or thio may be selected. A D-monomer with isocyanato group is highly reactive and an initiator with easily hydrolyzable groups, such as ester or trimethysilyloxy group, has be used. The reactive terminal groups of the comb copolymer are obtained by hydrolysis of the ester or trimethysilyloxy groups after desirable modification the comb copolymer has been carried out through isocyanato groups.

The pendent chain or chains of a macromer is a minor component of the comb copolymer and present in the range from 3% to 40% by weight of the comb copolymer, preferably from 5% to 25% by weight. The pendent chain or chains function as a compatibilizer for the backbone and makes the comb copolymer miscible with a thermoset. It is necessary to incorporate pendent chains of the present invention to an immiscible linear reactive modifier to make the resulting comb copolymer miscible. It may be advantageous to incorporated pendent chains to an already miscible linear reactive modifier, such as CTBN, to further improve miscibility. The pendent chain or chains also function as a compatibilizer for the elastomeric microphase to increase the interfacial interaction with the thermoset matrix after curing.

Once the elastomeric backbone component of the comb copolymer is chosen, the miscibility of the comb copolymer can be specifically tailored for a thermoset by selecting the type of macromer and the amounts of macromer to be incorporated. As the amounts of macromer increases, the miscibility increases and eventually the reactive comb copolymer becomes a flexibilizer instead of a toughener. The macromer of the present invention is generally a relatively narrow molecular weight distribution and provide the pendent chains which are randomly distributed along the backbone and substantially the same in chain length. The macromer of the present invention has a structure of (LM) and is selected from the group of polyester, polyether, polystyrene or polymethacrylate with repeating units in the range from 2 to about 250, preferably in the range from 2 to 100, most preferably in the rang from 3 to 25. The number of pendent chains per the comb copolymer is dependent on the amount of a macromer and molecular weight of a macromer. With a fixed amount of a macromer, the number of pendent chains per the comb copolymer is expected to be less for a macromer having higher molecular weight. As to be expected, the various species of comb copolymer made will have a structure consistent with the expected statistical distribution, a majority of the comb molecules having the expected number of pendent chains sought, fewer molecules having only one or two pendent chains, and still fewer with no chains.

It shall be noted that the terminal group, Z, of the macromer will become the terminal group of the pendent chains of a comb copolymer. The terminal group, Z, may be non-reactive. If Z is a reactive functional group having the same functionality of the terminal functional groups of the comb copolymer, Z functions as an additional reactive site for curing. If the functionality of Z is different from that of the terminal reactive groups of the comb copolymer, then it is very important to select an appropriate functional group which does not have significant reactivity with the terminal functional groups of the comb or the functional groups of D-monomer, if present, so as a premature reaction between or among them will not occur or, if does occur, will not be significant before using as a modifier.

One preferred method for making the comb is by solution polymerization in an essentially non-aqueous organic solution such as a ketone, in which the ethylenically unsaturated monomer(s), the macromer, and the initiator are soluble at the polymerization temperature, and after the polymerization reaction is complete, the comb copolymer formed is typically also soluble in the solvent. In a typical production of a comb with an acrylate backbone and polylactone chains, the solution polymerization may be done with ADVA to which a small amount of water, less than 10 parts per 100 parts of acetone, has been added to enhance the miscibility of ADVA in acetone, the preferred solvent. The polymerization may be carried out at a temperature in the range from 10° C. to about 150° C., depending upon the half-life of the initiator used. For active acrylate monomer, it may take up from 2 to 10 hours to achieve high conversion; for less active diene monomer, it may take up to 48 hours. The polymerization may be carried out in various ways. It may be carried by adding all monomer(s), macromer, and initiator to start the polymerization; or by adding all initiator first then metering in monomer(s) and macromer; or by adding all initiator and part of monomer(s) and macromer (referred to as background monomers) then metering in the remaining monomer(s) and macromer; or by metering monomer(s), macromer, and initiator. It is preferable to meter in a mixture of monomers and macromer to improve the uniformity of the composition of the comb copolymer.

It has also been discovered that the reactive modifier with terminal vinyl or amino groups, which can not be directly produced from polymerization with an initiator having a corresponding functional group, can be produced by converting the terminal carboxyl or hydroxyl groups of comb copolymer obtained from a free radical polymerization using a difunctional initiator. It has also been discovered that the reactive modifier with certain terminal groups, which is not economically produced from an initiator with a corresponding functional group or is not reactive enough with a thermoset, can be produced by converting more readily available terminal carboxyl or hydroxyl groups of comb copolymer. It has also been discovered that the terminal function groups of the comb may be converted to provide desirable or latent reactivity with the thermoset. Therefore the comb copolymer of the present invention may be obtained by converting the terminal functional groups of the comb (I) obtained by free-radical polymerization. Such converted comb copolymer may be represented by the structure

$$R^{e1}—Y—X—Q—X—Y—R^{e1} \quad (III)$$

wherein, $R^e$—Y— is directly derived from the terminal functional group, $R^e$—, of the comb (I) and $R^{e1}$—, selected from the group consisting of carboxyl, hydroxyl, amino, epoxy, vinyl, and thio group, is the new terminal functional group of the converted comb The conversion of functional groups may be carried out by known processes taught in the prior art. From a terminal carboxyl group, the conversion into a vinyl group may be made by reacting with glycidyl methacrylate or allyl glycidyl ether as disclosed in U.S. Pat. No. 4,129,713, 4,013,710, and 3,925,330; the conversion into a hydroxyl group may be made by reacting with ethylene oxide as disclosed in U.S. Pat. Nos. 3,712,916, 3,699,153, 3,551,471 and 3,712,916, or with ethylene glycol or a polyakylene glycol; the conversion into an amino group may be made by reacting with a diamine, preferable with different reactivity, such as aminoethyl piperazine as disclosed in U.S. Pat. No 4,133,957, 3,925,330, and 3,551,471; and, the conversion into an epoxy group may be made by reacting with a diepoxy compound, such as Epon® 828. From a terminal hydroxyl group, the conversation into a vinyl group may be made by reacting with a ethylenical unsaturated isocyanate, such as 2-isocyanatoethyl acrylate; and, the conversation into a carboxyl group may be made by reacting with an anhydride as disclosed in U.S. Pat. No. 4,786,749. In some cases, it may be more preferable to be carried out in two steps, such as the conversion of carboxyl or hydroxyl group into an epoxy group by reacting with epichlorohydrin and then with NaOH or the conversion of carboxyl into a vinyl group by reacting with a diepoxy compound then methacrylic acid.

When a terminal carboxyl group is converted into a hydroxyl group by reacting with ethylene oxide, the $R^e$—Y— in (III) is

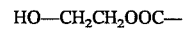

$$HO—CH_2CH_2OOC—$$

Wherein, $R^e$— is HO— (hydroxyl group); and, into a vinyl group by reacting with glycidyl acrylate, the $R^e$— Y— in (III) is

$CH_2=CHCOO-CH(OH)CH_2OOC-$

Wherein, $R^e$—is $CH_2=CHCOO$—(vinyl group).

The comb copolymer of the present invention of structure (I) can also be produced by attaching a pendent chain or chains to a copolymer with reactive ends (referred as starting copolymer), made by copolymerizing, in absent of a macromer, at least one E-monomer and D-monomer, optionally with R-monomer with a difunctional initiator, with coupling or condensation through the functional group of D-monomer randomly distributed along the backbone. Such comb copolymer having a structure of (I) wherein—Q—may be represented by a structure:

$$-[R]_{n'}-[M_o]_{n''}- \\ | \\ L-[M]_m-Z \qquad (IV)$$

wherein $[M_o]$, [M], Z, n', and n" are the same as in (II); [R] is derived from the D-monomer, and L is a linkage to the backbone which is contributed by reaction of the function group of the D-monomer group with a monofunctional or difunctional, most preferably monofunctional, polyester, polyether, polystyrene, or polymethacrylate having repeating units of $[M]_m$; $M_o$, M, Z, m, n' and n" as previously defined.

It is important to select the D-monomer with its functionality different from that of the terminal groups of the starting copolymer, more preferably, they have substantially different reactivity with the subsequent grafting reaction, so that the grafting will not occur predominately at the terminal groups. As an illustrative example, a starting copolymer of (BA/HEA) is made by a free radical polymerization, of 90 wt % of butyl acrylate (BA) and 10 wt % of 2-hydroxyethyl acrylate (HEA), in the absence of a macromer, with ADVA as an initiator, as described in the foregoing process. The copolymer of (BA/HEA) so made possesses carboxyl groups at both ends and hydroxyl groups on the HEA repeating units randomly distributed along the elastomeric backbone. The starting copolymer is then reacted with a monofunctional polyester or polyether having a terminal —NCO group. Because the terminal carboxyl group is substantially less reactive then the hydroxyl group, grafting of the pendent chains occurs with formation of a carbamate linkage by coupling with the hydroxyl group of the starting copolymer. The reactive comb copolymer of the present invention so made will have carboxyl groups at both end of elastomeric backbone of butyl acrylate and pendent chains of polyester or polyether attached to the backbone with carbamate linkages. The mono-functional polyester or polyether having a terminal -NCO group may be obtained by reacting a diisocyanate, preferably with different reactivity, with a monohydroxyl-terminated polyester or polyether at a one to one molar ratio. Grafting may also be carried, though less preferable, by reacting a diisocyanate with the starting copolymer first then coupling with a hydroxyl terminated polyester or polyether, or by reacting a diisocyanate with the starting copolymer and a hydroxyl terminated polyester or polyether together. The hydroxyl groups of the starting comb may also react with a anionic living polystyrene which results in a ether linkage. Dependent on the desirable number of pendent chains, not all of the hydroxyl groups of the starting comb have to be coupled.

It is known to a person skilled in the art to select an appropriate D-monomer so that the functional group of D-monomer will not react with the terminal functional groups of the starting copolymer prematurely before grafting the pendent chains. Consequently, it is more preferable to used an initiator having easily hydrolyzable groups to prepare the starting copolymer. The easily hydrolyzable group, such as ester or trimethysilyloxy group, is generally inert to the subsequent grafting reaction. As another illustrative example, a starting copolymer is made by a free radical polymerization, of 90 wt % of butyl acrylate (BA) and 10 wt % of 2-isocyanatoethyl acrylate (ICEA), in the absence of a macromer, with dimethyl ester of ADVA as an initiator, as described in the foregoing process. The copolymer so made possesses ester groups at both ends and isocyanato groups on the ICEA repeating units randomly distributed along the elastomeric backbone. The starting copolymer is then reacted with a hydroxyl terminated polyester or polyether, preferably monofunctional, to form a carbamate linkage by coupling with the isocyanato group of the starting copolymer. The reactive comb copolymer of the present invention will be obtained after hydrolysis.

The reactive comb copolymer of the present invention is useful as a reactive modifier for thermosetting resins, such as acrylic resin, polyester resin, polyurethane resin, epoxy resin, vinyl ester resin, and unsaturated polyester resin, as a toughener and/or a flexibilizer by proper selection of the terminal reactive groups to react with the target thermoset and the pendent chains for miscibility. The reactive comb copolymer of polyacrylate, which is free of olefinic unsaturation, is particularly useful for applications require ultraviolet light and/or thermo-oxidative resistance. It is known in the art that a carboxyl-terminated or an epoxy-terminated modifier is more suitable for acrylic resins, polyester resins, and epoxy resins; a hydroxyl-terminated or a thio-terminated modifier is more suitable for acrylic resins, polyester resins, and polyurethane resins; and, a vinyl-terminated modifier is more suitable for vinyl ester resins, and unsaturated polyester resins. Not every pendent chain of the comb polymer is effective to improve miscibility with all the thermosets. The pendent chains of a polyester or a polyether are the most favorable and effective on all foregoing mentioned thermosets. However, the pendent chains of a chlorine-containing polyepichlorohydrin may not be suitable for polyurethane resins because the isocyanato group may react with the chloride. The pendent chains of polystyrene are effective with acrylic resins but not with epoxy resins. Dependent of the type, a thermoset may be used, for example, in bonding and adhesives, laminates and composites, flooring, pipes, and coatings. Toughening will improve peel and shear strength in adhesive; make composites less brittle; and, improve impact and chip resistance in high solid, water base, solution, and powder coatings. The reactive comb copolymer of the present invention is also useful as a compatibilizing agent and dispersion agent for others reactive modifiers. When it is used as a compatibilizing agent, it will make an immiscible reactive modifier or a reactive modifier with relatively poor miscibility miscible with a thermoset or improve miscibility of a reactive modifier already miscible with a thermoset. When the reactive comb is used as a dispersion agent, it will disperse an immiscible reactive modifier as stable microparticles in a thermoset before and after curing.

In the following examples which illustrate the invention, all reference to parts is to parts by weight, unless otherwise stated ('gm' and 'g' are interchangeable).

The following is a glossary of identifying names and symbols used in the following examples:

Symbols:

phr—per 100 parts by weight of resin or polymer
Ephr—equivalent per 100 g of resin or polymer CEW—carboxyl equivalent weight
CT—carboxyl-terminated
HT—hydroxyl-terminated
ET—epoxy-terminated
AT—amine-terminated
VT—vinyl-terminated
Conventional Monomers:
BA—n-butyl acrylate
EHA—2-ethylhexyl acrylate
HEA—hydroxyethyl acrylate
AA—acrylic acid
AA Dimer—dimer of acrylic acid, Sipomer® β -CEA obtained from Alcolac Co.
CL—caprolactone
ECH—epichlorohydrin
HEMA—2-hydroxyethyl methacrylate
Macromers:
MPCL—macromer of polycaprolactone.
MPCL4—acrylic-terminated MPCL with molecular weight of 420 as calculated from hydroxyl number of 134 mg KOH/g.
MPCL6—acrylic-terminated MPCL with molecular weight of 640 as calculated from hydroxyl number of 87.8 mg KOH/g.
MPCL21—acrylic-terminated MPCL with molecular weight of 2100 as calculated from hydroxyl number of 26.7 mg KOH/g.
MPCL7—acrylic-terminated MPCL with molecular weight of 685 as calculated from hydroxy number of 82 mg KOH/g.
MPCL12—acrylic-terminated MPCL with molecular weight of 1256 as calculated from hydroxyl number of 45.5 mg KOH/g.
MPECH—macromer of polyepichlorohydrin.
MPECH1—acrylic-terminated MPECH with molecular weight of 856 prepared according to U.S. Pat. No. Re. 31,468 to Hsu from epichlorohydrin and hydroxyethyl acrylate with triethyloxonium hexafluorophosphate.
Free-radical Initiators:
ADVA—4,4'-azobis-(4-cyano-pentanoic acid)
AHMP—2,2'-azobis[2-(hydroxymethyl) propionitrile]
Reactive Polymers:
CTA—carboxyl-terminated polyacrylate
MCTA—macromer modified carboxyl-terminated polyacrylate, a reactive comb copolymer of the present invention
HTA—hydroxyl-terminated polyacrylate
MHTA—macromer modified hydroxyl-terminated polyacrylate, a reactive comb copolymer of the present invention
MATA—macromer modified amine-terminated polyacrylate, a reactive comb copolymer of the present invention
META—macromer modified epoxy-terminated polyacrylate, a reactive comb copolymer of the present invention.
MVTA—macromer modified vinyl-terminated polyacrylate, a reactive comb copolymer of the present invention
CTBN—carboxyl-terminated butadiene and acrylonitrile copolymer.
CTBNX8—carboxyl-terminated butadiene and acrylonitrile copolymer, Hycar® CTBN 1300X8, obtained from BF Goodrich Co. contains 18 wt % of acrylonitrile, has a carboxyl number of 29, and Brookfield viscosity of 135, 000 cps at 27° C.
CTBNX13—carboxyl-terminated butadiene and acrylonitrile copolymer, Hycar® CTBN 1300X13, obtained from BF Goodrich Co. contains 26 wt % of acrylonitrile, has a carboxyl number of 32, and Brookfield viscosity of 500, 000 cps at 27° C.

EXAMPLES 1–4

Four reactive comb copolymers, identified as MCTA1–4, having a backbone of polyacrylate with a carboxyl group at each end, and entrained in the backbone are pendent chains derived from a macromer of polycaprolactone, were synthesized. MCTA1 is the first of four comb copolymers made by copolymerizing 85 parts BA and 15 parts MPCL6 (MW= 640) with ADVA by a free-radical polymerization in a 2-L jacketed glass Buchi reactor.

72 gm of MPCL are dissolved in 408 gm of BA in a container, and the solution purged with nitrogen to remove any oxygen present. Separately, 16.3 wt % solution of ADVA initiator in an acetone and water mixture in a 85:15 ratio by wt was prepared.

The reactor is charged, in the following order, starting with 185.5 gm acetone, adding 106 gm mixed monomer solution referred to as the "background monomers", and 294.5 gm acetone solution of ADVA containing 48 gm of neat ADVA. The reactor containing ADVA/monomers=10/ 90 by wt or 5.2/94.8 by mole, was evacuated until the acetone boiled (about 20" Hg), then pressurized to 30 psig with nitrogen, and the procedure repeated three times.

The reactor was then heated to 80° C. over about 45 min., the remaining mixed monomer solution, referred to as "metering monomers", metered into the reactor over 4 hours, the temperature being maintained at 80° C. and the pressure at 30 psig. After the completion of metering, the reaction mass was post polymerized for an additional one hour, resulting in a total polymerization time of 5 hr. At the end of post polymerization, the reactor was cooled down, then the polymer solution was blown down to an one-gallon jar. Total solids obtained was 56.7%.

Subsequently, 0.72 g of Irganox 1010 (antioxidant) is added to the polymer solution, which was filtered and washed with water, and then the solvent and unpolymerized BA were removed using a rotary evaporator under vacuum and heat.

The preparation of the first comb MCTA1 yielded 440 gm of very light yellow, clear liquid polymer corresponding to an yield of 83% despite some small loss of polymer during each of the filtration, .washing, drying and transfer steps.

The foregoing polymerization procedure and conditions are maintained for each of the preparations for three additional comb copolymers, MCTA2, MCTA3 and MCTA4. The polymerization conditions are summarized below:

| | |
|---|---|
| Temperature, °C. | 80 |
| Pressure, psig | 30 |
| background monomers, gm | 106 |
| Metering monomers, gm | 374 |
| Monomer Metering time, hr | 4 |
| Post polymerization time, hr | 1 |
| Total time of polymerization, hr | 5 |

In four examples, the polymerization conditions, macromer, butyl acrylate (BA), and initiator used were the same with the amounts of the macromer varied as set forth in Table I below, in which the results of each run, and the characterization of the comb copolymers formed, are also given:

TABLE I

| MPCL/BA by wt | MCTA1 15/85 | MCTA2 10/90 | MCTA3 20/80 | MCTA4 25/75 |
|---|---|---|---|---|
| Polymerization: | | | | |
| Monomer BA | | | | |
| wt, gm | 408 | 432 | 384 | 360 |
| moles, | 3.18 | 3.37 | 3.00 | 2.81 |
| Macromer MPCL6 | | | | |
| Wt., gm | 72 | 48 | 96 | 120 |
| moles | 0.113 | 0.075 | 0.15 | 0.188 |
| Total Solids, % | 56.70 | 63.39 | 57.04 | 57.62 |
| Product, gm | 440 | 422 | 415 | 416 |
| Yields, % | 83 | 79 | 78 | 78 |
| Heat loss, % | 0.86 | 0.67 | 0.75 | 0.81 |
| Characterization: | | | | |
| MPCL wt % in polymer by NMR | 13 | 10 | 18 | 24 |
| Carboxyl, Ephr | 0.036 | 0.034 | 0.034 | 0.035 |
| Acid No. | 20.20 | 19.10 | 19.10 | 19.60 |
| CEW | 2778 | 2941 | 2941 | 2857 |
| GPC: | | | | |
| Mn $\times 10^3$ | 5.46 | 5.04 | 5.40 | 5.69 |
| Nw $\times 10^3$ | 37.00 | 30.00 | 35.00 | 40.90 |
| Mw/Mn | 6.77 | 5.96 | 6.49 | 7.18 |
| Peak $\times 10^3$ | 18.30 | 19.40 | 17.30 | 20.20 |
| Brookfield Viscosity at 27° C. cps $\times 10^3$ | 154 | 122 | 96 | 98 |

The examples show that the comb copolymers with varying amount of macromer can be made in high yield and the yield, carboxyl content, and molecular weight are substantially insensitive to the change in the amount of macromer used, and that up to 25% by wt of each macromer is entrained in the comb. A viscosity in the range from about 100,000–150,000 cps is deemed substantially similar with respect to using the modifier.

As-shown in Table I, both acid numbers and Brookfield viscosities of four comb copolymers are comparable to those for commercial Hycar® CTBN 1300x8.

Glass transition temperatures were determined by Perkin-Elmer DSC-2 differential scanning calorimeter under helium. The comb copolymers have a Tg in the range from –44° C. to –49° C., Macromer MPCL6 has a Tg at –69° C. and a homopolymer of butyl acrylate has a Tg at –45° C.

Proton NMR spectra were acquired at 500 MHz using a Bruker AM-200 spectrometer in chloroform-d at 30° C. using TMS as a reference. The proton NMR spectra of comb copolymers show characteristic chemical shifts of n-butyl acrylate repeating units at 4.06 ppm for —CH$_3$ protons, 1.39 ppm and 1.64 ppm for C-3 and C-2 methylene protons, respectively, and at 4.06 ppm for —OCH$_2$ protons corresponding to the butyl group and at 2.3 ppm for α-CH proton and 1.9 ppm for β-CH$_2$ protons corresponding to the backbone component. The characteristic chemical shifts of MPCL repeating units appear at 4.06, 2.30, 1.65, and 1.4 ppm corresponding to the repeating units of CPL, at 4.3(m) ppm for the ethylene oxide unit of the terminal acryloylethyl group, and at 3.6 ppm as a triplet for the protons of the methylene group of the CPL unit adjacent to the terminal hydroxyl group. The absence of or extremely small of resonance signals in the range from 5.5 to 6.5 ppm indicates that the residue BA and unpolymerized MPCL are negligible in the final MCTA. The composition of comb copolymers are determined by the integration of the spectra and shown in Table I.

Carbon-13 NMR spectra were acquired at 20.1 MHz using Bruker WP-80 spectrometer in chloroform-d with internal tetramethylsilane reference at 30²° C. The carbon-13 NMR spectra of comb copolymers show characteristic chemical shifts of n-butyl acrylate repeating units at 13.8, 19.1, 30.7, and 64.5 ppm for —CH$_3$, C-3, C-2, and C-1 (—OCH$_2$) methylene carbons of the n-butyl group, respectively, at 174.6 ppm for the carbonyl carbon, and at 41.5 ppm for α-CH carbon and 35.3 ppm for β-CH$_2$ carbon corresponding to the backbone component. The characteristic chemical shifts of MPCL repeating units appear at 33.7, 25.5, 24.6, and 64.1 ppm for methylene carbons and 173.6 ppm for the carbonyl carbon corresponding to the repeating units of CPL, and at 62.3 ppm the carbon of the methylene group of the CPL unit adjacent to the terminal hydroxyl group.

GPC (gel permeation chromatography) analysis was carried out at 40° C. using Water's GPC model 200 instrument with columns packed with styragel. THF was used as a carrier solvent. The columns were calibrated by using standard narrow distribution polystyrene. All molecular weights of MCTA polymers determined by GPC are in terms of polystyrene equivalent molecular weight and shown in Table I. Molecular weight distribution (Mw/Mn) of MCTA is relatively broad. The broad Mw/Mn is characteristic of a free-radical polymerization.

EXAMPLES 5–8

In a manner analogous to that illustrated in the foregoing Example 1, additional MCTA polymers were synthesized with varied mol wts of MPCL in the range from 420 to 2100. The first column lists the results with the lowest mol wt; the second column repeats the data of MCTA1, for comparison. The polymerization were carried out at a fixed MPCL/BA ratio of 15/85 using 72 gm of macromer and 408 gm of BA in acetone with 294.5 gm of the same 16.3% solution ADVA initiator, under the same polymerization conditions at 80° C., 106 gm of background monomer, and 374 gm metering monomers, with the same polymerization conditions shown in Examples 1–4.

All polymerization gave excellent yields of about 80% or better. All MCTA copolymers show characteristic NMR chemical shifts as described in Examples 1–4. The composition as determined by NMR, carboxyl content, GPC data, and Brookfield viscosity are summarized in Table II.

TABLE II

| | _____ Example _____ | | | | |
|---|---|---|---|---|---|
| | 5<br>MCTA5 | 1<br>MCTA1 | 6<br>MCTA6 | 7<br>MCTA7 | 8<br>MCTA8 |
| Macromer: | | | | | |
| ID | MPCL3 | MPCL6 | MPCL7 | MPCL12 | MPCL21 |
| MW | 420 | 640 | 686 | 1256 | 2100 |
| moles | 0.171 | 0.113 | 0.105 | 0.057 | 0.034 |
| Total solids % | 57.58 | 56.70 | 57.38 | 57.93 | 58.14 |
| Product, g | 420 | 440 | 423 | 423 | 415 |
| Yield, % | 79 | 83 | 80 | 80 | 78 |
| Heat loss, % | 0.054 | 0.859 | 0.031 | 0.027 | 0.072 |
| MPCL wt % in polymer determined by NMR | 14 | 13 | 15 | 17 | 15 |
| Carboxyl, Ephr | 0.037 | 0.036 | 0.034 | 0.035 | 0.036 |
| Acid No. | 20.76 | 20.20 | 19.07 | 19.64 | 20.20 |
| CEW | 2702 | 2778 | 2941 | 2857 | 2777 |
| GPC: | | | | | |
| $M_n \times 10^3$ | 5.3 | 5.5 | 5.2 | 5.5 | 5.0 |
| $M_w \times 10^3$ | 34.9 | 37.0 | 30.1 | 32.0 | 22.6 |
| $M_w/M_n$ | 6.6 | 6.8 | 5.8 | 5.8 | 4.5 |
| Peak $\times 10^3$ | 16.0 | 18.3 | 15.6 | 19.2 | 16.0 |
| Brookfield Viscosity at 27° C. cps $\times 10^3$ | 168 | 154 | 127 | 222 | ND* |

*ND = not determined

The foregoing data in Table II show that the comb copolymers of this invention with varying length of pendent chains can be made in high yield and the yield, carboxyl content, and molecular weight are substantially insensitive to the change in the molecular weight of macromer used.

EXAMPLE 9

In a manner analogous to the illustrated in the foregoing Example 1, MCTA polymer was synthesized with MPCL6 at a MPCL/BA weight ratio of 15/85 except at a higher temperature, 95° C., and with less ADVA (compared to Example 1) as an initiator (202 gm of the 16.3% solution used =33.3 gm ADVA neat, ADVA/monomers= 9.2/90.8 by wt or 3.6/96.4 by mole). The polymerization at 95° C. was completed in 2 hrs (1 hr metering, and 1 hr post-polymerization) compared to 5 hrs at 80° C. The polymerization conditions and characterization of the comb copolymer are presented below in Table III.

EXAMPLES 10–12

The following examples provide evidence that the functionality of the comb may be increased by adding a D-monomer. For additional carboxyl functionality in a comb with a carboxyl-terminated backbone, the D-monomer may be acrylic acid, or a dimer of acrylic acid. Whether in a comb with a carboxyl- or a hydroxyl-terminated backbone, hydroxyethyl acrylate (HEA) may be used as the D-monomer to introduce additional hydroxyl functionality.

In a manner analogous to that illustrated in the foregoing Example 1, MCTA polymer was synthesized with 15 parts MPCL6 (72 g) and the remainder portioned between BA and a third monomer (D-monomer), AA and AA dimer (1 or 2 parts) with 48 g of neat ADVA. Evidence that the D-monomer is entrained in the comb is the higher acid number and low carboxyl equivalent weight of the polymers which are given in the following Table III.

TABLE III

| | _____ Example _____ | | | |
|---|---|---|---|---|
| MPCL/BA/D-monomer | 9<br>MCTA15<br>15/85 | 10<br>MCTA16<br>15/84/1 | 11<br>MCTA17<br>15/83/2 | 12<br>MCTA18<br>15/83/2 |
| Polymerization: | | | | |
| BA, | | | | |
| g | 408 | 327 | 327 | 327 |
| moles | 3.18 | 2.55 | 2.55 | 2.55 |
| AA, | | | | |
| g | — | 4.20 | 8.40 | — |
| moles | — | 0.06 | 0.12 | — |
| AA Dimer, | | | | |
| g | — | — | — | 8.40 |
| moles | — | — | — | 0.06 |
| Background, gm | 192 | 85 | 85 | 85 |
| Metering, gm | 288 | 300 | 300 | 300 |
| Metering time, hr | 1.0 | 3.5 | 3.5 | 3.5 |
| Polymerization Temp | 95° C. | 80° C. | 80° C. | 80° C. |
| Post Pzn Time, hrs | 1.0 | 0.5 | 0.5 | 0.5 |
| Total Time, hrs | 2.0 | 4.0 | 4.0 | 4.0 |
| Total Solids, % | 56.82 | 53.92 | 55.63 | 57.13 |
| Product, gm | 422 | 300 | 321 | 334 |
| Heat loss, % | 0.056 | 0.380 | 0.260 | 0.340 |
| Characterization: | | | | |
| Carboxyl, Ephr | 0.033 | 0.070 | 0.082 | 0.069 |
| Acid No. | 18.51 | 39.27 | 46.00 | 38.71 |
| CEW | 3030 | 1428 | 1219 | 1449 |
| Brookfield Viscosity @ 27° C. cps $\times 10^3$ | 248 | 416 | 842 | 429 |

The foregoing data in Table III show that the comb copolymers of this invention with a D-monomer can be made in high yield. The incorporation of AA or AA dimer increases viscosity substantially.

EXAMPLE 13

In a manner analogous to that illustrated in the foregoing Example 1, a comb copolymer, MCTA13, was synthesized with ethylhexyl acrylate (EHA) and MPCL6 (MPCL/EHA 15/85) under the same conditions. The results are set forth in Table IV, below (after Example 15). The data in Table IV show that the comb copolymer having EHA as a backbone component can also be made in as high yield as the copolymers having BA as a backbone component as made in foregoing examples.

EXAMPLE 14

In a manner analogous to that illustrated in the foregoing Example 1, MCTA polymer was synthesized with BA and MPECH1 (mol wt 856) in the MPECH/BA ratio of 15/85 by wt to introduce a polyether as pendent chains of the comb. The objective is to synthesize a carboxyl-terminated comb copolymer modified with a polyether. The proton NMR spectra of MCTA show characteristic chemical shifts corresponding to repeating units of BA as described in Example 1 and ECH of MPECH 3.6 and 3.8 ppm. The integrated areas indicate about 16.7 wt % of MPECH is incorporated in MCTA. Carboxyl content, GPC data, total chloride, and Brookfield viscosity are also summarized in Table IV, below (after Example 15). The total chloride of 5.27 wt % indicates that 15.8 wt % of MPECH is incorporated in the comb. The data in Table IV show that the comb copolymer having pendent chains of a polyether can be made in as high yield as the copolymers having pendent chains of a polyester as made in foregoing examples.

EXAMPLE 15

In a manner analogous to that illustrated in the foregoing Example 1, hydroxyl-terminated comb copolymer (MHTA) was synthesized with BA and MPCL (MPCL6) at the MPCL/BA weight ratio of 15/85. The polymerization were carried out in acetone at 80° C. with AHMP (azo initiator, hydroxyl functional) as an initiator. The polymerization conditions, GPC data and Brookfield viscosity are set forth in Table IV. The data in Table IV show that the comb copolymer having terminal reactive hydroxyl groups can be made from AHMP as the copolymers having terminal reactive carboxyl groups as made in foregoing examples with ADVA.

TABLE IV

| | Example | | |
|---|---|---|---|
| | 13 MCTA19 | 14 MCTA20 | 15 MHTA1 |
| Polymerization: | | | |
| Monomer: | | | |
| BA, | | | |
| g | — | 384.00 | 408.00 |
| moles | — | 3.00 | 3.18 |
| EHA, | | | |
| g | 327.25 | — | — |
| moles | 1.78 | — | — |
| Macromer: | MPCL6 | MPECH1 | MPCL6 |
| MW | 640.00 | 856.00 | 640.00 |
| g | 57.75 | 96.00 | 92.00 |
| moles | 0.090 | 0.112 | 0.144 |
| Azo initiator | ADVA | ADVA | AHMP |
| Initiator Soln: | | | |
| g, | 234.00 | 294.50 | 172.40 |
| wt % | 16.30 | 16.30 | 16.30 |
| neat, g | 38.14 | 48.00 | 33.60 |
| moles | 0.136 | 0.171 | 0.171 |
| Monomer/ADVA by wt. | 10.09 | 10.00 | 14.29 |
| Acetone, g | 160.00 | 185.50 | 184.50 |
| Total, g | 721.25 | 480.00 | 356.90 |
| background Monomer, g | 85.00 | 106.00 | 106.00 |
| Metered Monomer, g | 309.00 | 374.00 | 374.00 |
| Metering Time, hr | 4.00 | 4.00 | 4.00 |
| Post Pzn Time, hr | 0.50 | 1.00 | 1.00 |
| Total Time, hr | 4.50 | 5.00 | 5.00 |
| Total Solids, % | 51.86 | 60.16 | 62.39 |
| Product, g | 366.00 | 409 | 378 |
| Yield, % | 78.04 | 73.10 | 67.79 |
| Heat loss, % | 0.62 | 0.01 | 0.19 |
| Characterization: | | | |
| Carboxyl, Ephr | 0.052 | 0.024 | — |
| Acid No. | 29.17 | 13.46 | — |
| CEW | 1923 | 4166 | — |
| Total Cl, wt % | — | 5.27 | — |
| GPC: | | | |
| Mn × 10³ | — | 3.92 | 19.90 |
| Mw × 10³ | — | 29.20 | 209.00 |
| Mw/Mn | — | 7.44 | 10.50 |
| Peak × 10³ | — | 13.00 | 84.20 |
| Brookfield Viscosity at 27° C. cps × 10³ | 113 | 328 | 1888 |

COMPARATIVE EXAMPLES 16–17

In a manner analogous to that illustrated in the foregoing Example 1, two comparative carboxyl-terminated homopolymer of BA and HEA synthesized in the absence of a macromer. The homopolymers made are straight-chain polymers without pendent chains. The comparison is set forth in Table V.

TABLE V

| | Example | |
|---|---|---|
| | 16 CTA1 | 17 CTA2 |
| Polymerization: | | |
| Monomer: | | |
| BA, | | |
| g | 385.00 | — |
| moles | 3.00 | — |
| EHA, | | |
| g | — | 385.00 |
| moles | — | 2.09 |
| Monomer/ADVA by wt. | 10 | 10 |
| Background Monomers, g | 85.00 | 85.00 |
| Metering Monomer, g | 300.00 | 300.00 |
| Metering Time, hr | 3.5 | 3.5 |
| Post Pzn Time, hr | 0.5 | 0.5 |
| Total Time, hr | 4.0 | 4.0 |
| Total Solids, % | 58.00 | 52.42 |
| Product, g | 311 | 362 |
| Yield, % | 73.50 | 85.55 |
| Heat loss, % | 0.64 | 0.75 |
| Characterization: | | |

TABLE V-continued

| | Example | |
|---|---|---|
| | 16 CTA1 | 17 CTA2 |
| Carboxyl, Ephr | 0.055 | 0.037 |
| Acid No. | 30.86 | 20.76 |
| CEW | 1818 | 2702 |

EXAMPLE 18

In this example the functionality of MCTA comb copolymers was measured. Since the mol wt of a MCTA is determined by GPC, it is measured in terms of equivalent weight relative to standard polystyrene. A mol wt so determined may not be the true mol wt. A more meaningful mol wt of a MCTA is determined by VPO (vapor pressure osmometry) in toluene. The functionality was estimated from the number average mol wt Mn from VPO and the CEW (carboxyl equivalent weight) from carboxyl content. The results listed in Table VI, indicate that the MCTA copolymers have an estimated functionality in the range from 1.6–1.9. Since mol wts obtained from VPO were not corrected for the presence of antioxidant and 2–5% of oligomers (Mn less than 500 as determined by GPC), the numbers measured tend to be lower than the actual mol wt. As a result, the true functionality of a MCTA would be expected to be higher than an estimated value as obtained herein.

TABLE VI

| | Functionality of MCTA | | |
|---|---|---|---|
| Polymer | Fn | Mn by VPO | CEW |
| CTA1 | 2.2 | 6655 | 3030 |
| MCTA1 | 1.6 | 4958 | 3030 |
| MCTA5 | 1.9 | 5253 | 2703 |
| MCTA6 | 1.6 | 4751 | 2941 |
| MCTA7 | 1.7 | 4816 | 2857 |
| MCTA8 | 1.8 | 4962 | 2857 |

EXAMPLE 19

In this example the thermo-oxidative stability of MCTA comb copolymer is compared with commercial CTBNX8 and CTA in an OIT (oxidative induction time) test by DSC (differential scanning calorimetry), similar to ASTM-D 3895 for polyethylene, except at a temperature of 150° C. and 210° C. instead of 200° C. The test requires that the sample be heated in an inert atmosphere at a specified rate until it reaches 150° C. at which time the atmosphere is changed to oxygen.

The sample is then held until oxidative decomposition occurs, as noted by the change in the DSC curve in an exothermic direction. The time taken up to that at which decomposition is seen, is the OIT.

The results show that acrylic polymers of MCTA and CTA containing no olefinically unsaturated repeating units are more stable than CTBN containing unsaturated butadiene repeating units. CBTN shows an OIT of 2 min at 150° C., whereas both MCTA and CTA show an OIT in the range from 20–40 min, depending upon the particular components of the copolymers. At 210° C., the test shows that MCTA is as stable as CTA and has an OIT in excess of 2 min. This evidence proves that the pendent chains of MPCL in MCTA does not impair stability of the CTA.

EXAMPLE 20

In this example, the miscibility of various MCTA comb polymers in DGEBA (n=0.03) are studied and compared with a CTA polymer and commercial CTBN polymers by cloud-point study. The application of cloud-point for miscibility studies in the CTBN—epoxy resin system has been reported by D. Verchere, et al., in Polymer, 30, 107 (1989).

As in the reference study, the cloud-point was recorded when the transparent solution of a reactive polymer in epoxy resin becomes opaque when cooled at a constant rate. Below the cloud-point, the mixture is two phases. The cloud-points of each reactive polymer were measured by varying the concentration of comb in the epoxy resin. For simplicity, the maximum temperature (Tmax) for a cloud-point, for each reactive polymer is set forth in Table VII.

The results shown in Table VII provide a scale for relative miscibility of various reactive polymers in epoxy resin. They also indicate the incorporation of macromer pendant chains into polyacrylate has made CTA which is normally immiscible in an epoxy resin even at elevated temperature in the range from about 50° C. to 84° C., miscible. Unmodified CTA is not miscible below 85° C.

Though unmodified CTA is miscible in DGEBA and forms a single phase at above 85° C., it cause macroscopic demixing of the elastomer before curing or separates from the epoxy matrix prematurely during curing and forms elastomeric particles too large for toughening purpose because of unfavorable miscibility. On the other hand, commercial CTBNX8 and CTBNX13 (which have unsaturation in the chains) with Tmax cloud-points of 50° C. and below 0° C., respectively, have been shown to form a microphase of elastomeric particles which provide effective toughening. Furthermore, CTBNX13 with lower Tmax performs much better than CTBNX8 as a toughening agent for epoxy resins. As shown in Table VII, the Tmax temperatures of MCTA1 MCTA2, and MCTA5 comb copolymers are in the range between CTBNX8 and CTBNX13, and MCTA3 and MCTA4 comb copolymers have Tmax below 0° C. The data also show that the miscibility increases as the amounts of macromer used increase.

TABLE VII

| Sample | MPCL wt % in MCTA | Mn of MPCL | Tmax, °C. |
|---|---|---|---|
| CTA 1 | — | — | 85 |
| CTBNX8 | — | — | 50 |
| MCTA2 | 10 | 640 | 33 |
| MCTA1 | 15 | 640 | 18 |
| MCTA3 | 20 | 640 | <0 |
| MCTA4 | 25 | 640 | <0 |
| MCTA5 | 15 | 420 | 13 |
| CTBNX13 | — | — | <0 |

Further evidence of miscibility provided by incorporation of MPCL pendent chains are shown in this example, in which the miscibility of various MCTA comb copolymers in Derakane® 8084 is studied and compared with CTA polymer and commercial CTBN polymers. Derakane® 8084 is an elastomer modified vinyl ester resin obtained from Dow Chemical Co. In this study, a reactive polymer was mixed with Derakane® 8084. Then the mixture was poured into a 100 ml graduated cylinder and the miscibility was measured by the stability of the mixture in ml of separation/day. Commercial CTBNX8, CTBNX13, and VTBNX33 do not form a homogenous mixture with Derakane 8084 initially. Only commercial ETBNX40 forms homogenous solution, however, it is less miscible compared to MCTA4 and MCTA6 (MPCL modified) and MCTA20 (MPECH modified) comb copolymers of this invention. The reactive polymers of this invention show no phase separation for up to 3 days. The results are set forth in Table VIII.

TABLE VIII

| | Example | | | |
|---|---|---|---|---|
| | 25A ETBNX40 | 25B MCTA4 | 25C MCTA6 | 25D MCTA20 |
| Derakane ® 8084 | 100 | 100 | 100 | 100 |
| Reactive Polymer | 6 | 6 | 5.3 | 5.3 |
| Day: | ml of Separation | | | |
| 1 | 0 | 0 | 0 | 0 |
| 2 | 3 | 0 | 0 | 0 |
| 3 | 6 | 0 | 0 | 0 |
| 6 | 8 | 0 | 5 | 5 |

EXAMPLE 22

Since only carboxyl (COOH), hydroxyl (OH), thio (SH) and epoxy terminal groups may be directly introduced on the backbone of a comb copolymer made with an initiator, other end groups are introduced by conversion of one of the foregoing directly introduced end groups. Epoxy end groups are more economically introduced by conversion than directly.

In this example, META polymers are prepared by converting the terminal carboxyl groups on the backbone of MCTA into epoxy groups by reacting with Epon 828 in a ratio of (epoxy resin)/(MCTA)=3:2 by wt. At 130° C., 250 g of MCTA1 from Example 1 are reacted with 375 g of Epon 828 (epoxy equivalent weight 190) for 7.5 hrs under a nitrogen atmosphere in a three-neck flask equipped with a mechanical stirrer, a condenser, and a nitrogen inlet. 594 g of epoxy-terminated adduct are obtained. The META1 obtained from the reaction is a single phase, has a Brookfield viscosity of 80,600 cps at 27° C., and a carboxyl content of less than 0.001 Ephr and an epoxy equivalent weight of 338.

DSC analysis shows that the MCTA/epoxy adduct has a single Tg of −27.4° C. There is no Tg at −15.1° C. corresponding to Epon 828; or, at 47° C. corresponding to MCTA. The single Tg indicates that META is miscible with end-reacted Epon resin. In a procedure analogous to the foregoing, the carboxyl groups of MCTA2, MCTA3, MCTA4, MCTA5, and MCTA6, are converted into epoxy groups by reacting with Epon 828, as evidenced by a single Tg. On the other hand, ETA polymers obtained from comparable CTA1 (butyl acrylate homopolymer) and CTA2 (ethylhexyl acrylate homopolymer) with no pendent chain of PCL, made in analogous manner, result in a two-phase system.

EXAMPLE 23

In this example, MATA polymer is prepared by converting the terminal COOH groups on the backbone of MCTA into amino groups by reacting with aminoethyl piperazine at the equivalent ratio of amino/carboxyl in the range from 1.85 to 1.0. At 140° C., 150 g of MCTA1 from Example 1 are reacted with 12.4 gm of aminoethyl piperazine for 14 hrs under a nitrogen atmosphere in a three-neck flask equipped with a mechanical stirrer, a condenser, and a nitrogen inlet. MATA is a single phase highly viscous polymer and has a carboxyl content of less than 0.01 Ephr.

EXAMPLE 24

In this example, MVTA polymer is prepared by converting the terminal COOH groups on the backbone of MCTA into unsaturated vinyl groups by reacting with glycidyl methacrylate at the equivalent ratio of vinyl/carboxyl=1.0. At 110° C., 60 gm of MCTA1 from Example 1 are reacted with 3 gm glycidyl methacrylate in a three-neck flask equipped with a mechanical stirrer and a condenser until the carboxyl content of the mixture below 0.001 Ephr.

COMPARATIVE EXAMPLES 25–26 AND EXAMPLES 27–30

In these examples, MCTA (Examples 27–29) and MATA (Example 30) comb copolymers are evaluated as tougheners for epoxy resins, and compared with commercial CTBNX8 (Example 26) and the one without a toughener (Example 25). The epoxy resin is a 50/50 by wt mixture of D.E.R® 661 (EEW=500–560) obtained from Dow Chemical Co. and Epon® 828 (EEW=185–192) obtained from Shell Chemical Co, both being DGEBA epoxy resins. The reactive modifiers are evaluated as a 3:2 epoxy adduct as made in Example 22. DDS (4,4'-diaminodiphenyl sulfone), which is sold commercially by Ciba-Geigy Co. as Hardener HT 976, was used as a curing agent. The recipes set forth below in Table IX were prepared in the manner described hereafter.

A difunctional META1, epoxy-terminated epoxy adduct of MCTA1 (carboxyl-terminated comb copolymer of BA/FA at 85/15 by weight) made in Example 22 was mixed in a glass jar with Epon® 828 and D.E.R.® 661 at 135° C., using a mechanical stirrer. DDS curing agent was then added to the mixture. After the mixture was degassed under vacuum, it was cast into an 8"×10"×0.25" (20 cm×25 cm×0.635 cm) Teflon® resin coated aluminum mold, and cured for 2 hr at 170° C. to form plaques. In Examples 27 and 28, the cured epoxy resins contain 10 and 15 phr of MCTA1, respectively. In a similar manner, samples of epoxy resin without a toughening agent and with a 3:2 epoxy adduct of CTBNX8 as a toughening agent, were prepared for comparative purpose as Comparative Examples 25 and 26, respectively. In Example 31, MATA1 (amino-terminated comb copolymer of BA/FA at 85/15 by weight) made in Example 23 is evaluated at 10 phr. In Example 29, which has the same recipe as Example 27, is cured at multiple stages: two hours at 135° C. two hours at 180° C., and two hours at 250°.

Specimens for physical testing were machined from these 0.25" plaques. The following physical testings were carried out in accordance with ASTM standards: Tensile and elongation, ASTM D-638; fracture energies using a compact tension specimen, ASTM E-399; Flexural, ASTM D-790; Heat Distortion, ASTM D-648; and Durometer Hardness "D", ASTM D-2240. Glass transitions (Tg) are measured using a Mettler DSC instrument.

The results of physical testings are also set forth in Table IX. The data in Comparative Example 26 show about a three-fold increase in the fracture energy $G_{IC}$ after mixing an epoxy adduct of commercial CTBNX8 at 10 phr into the unmodified mixed epoxy resins of Example 25 which is free of elastomer. The data in Example 28 show that the improvement of toughness as indicated by increasing the fracture energy of the cured resin by incorporating of MCTA1 of the present invention at 15 phr as an epoxy adduct is as good as that by incorporating CTBNX8 at 10 phr. Although the improvement of toughness by incorporating of MCTA1 at 10 phr in Example 27 is not as good as that of incorporating CTBNX8, but MCTA1 at 10 phr still show about a two-fold increase in the fracture energy $G_{IC}$. The data in Example 30 show that the performance of MATA1 of the present invention as a toughener is nearly as good as that of CTBNX8. Comparing to Example 28, Example 29 shows that the heat distortion temperature (HDT) of cured epoxy resin can be significantly increased by multiple-stage curing. Though all elastomer-modified cured epoxy resins suffer some reduction in tensile strength, flexural strength, and HDT, such reduction is not generally sufficient to detract from their use for the purpose at hand.

reaction of methacrylic acid. After diluted with styrene monomer at resin/styrene=60/40 by weight, the final resin, VRE1, has 7.5 wt % of MCTA1 which is incorporated in the backbone of the resin and used in Example 32.

In a procedure analogous to the foregoing, the omermodified vinyl ester resin in styrene, VER2, having 12.5 wt % of MCTA1 was prepared from 62.8 g of MCTA1 and used in Example 33.

The vinyl ester resins were cured with a combination of cobalt naphthenate at 0.5 phr and MEK peroxide at 2.0 phr, in 8"×10"×0.25" (20 cm×25 cm×0,635 cm) Teflon® resin-coated aluminum molds. All recipes were cured for one hour at 60° C. plus two hours at 120° C., to form plaques.

TABLE IX

Physical Properties of DER 661/Epon 828 with Modified CTA cured with DDS
Comparative

| | Example | | | | | |
|---|---|---|---|---|---|---|
| | 25 | 26 | 27 | 28 | 29 | 30 |
| Elastomer: | none | CTBNX8 | MCTA1 | MCTA1 | MCTA1 | ATA1 |
| Elastomer, phr | 0 | 10 | 10 | 15 | 15 | 10 |
| RECIPES FOR PLAQUES: | | | | | | |
| DER 661 | 50 | 50 | 50 | 50 | 50 | 50 |
| Epon 828 | 50 | 35 | 35 | 22.5 | 22.5 | 50 |
| META1 epoxy adduct | — | — | 25 | 37.5 | 37.5 | — |
| ATA | — | — | — | — | — | 10 |
| CTBN X8 epoxy adduct | — | 25 | — | — | — | — |
| DDS | 24 | 24 | 24 | 24 | 24 | 24 |
| PHYSICAL PROPERTIES: | | | | | | |
| Tensile, ASTM D-638 | | | | | | |
| Strength at Break, psi | 13865 | 10830 | 11120 | 9939 | 10130 | 8298 |
| Elongation at Break, % | 7.1 | 7.1 | 5.5 | 6.4 | 6.4 | 3.2 |
| Modulus, 1000 × psi | 455 | 369 | 360 | 326 | 309 | 392 |
| Flexural Test, ASTM D-790 | | | | | | |
| Strength, psi | 19030 | 15670 | 16070 | 14200 | 14020 | 12730 |
| Elongation, % | 0.08 | 0.07 | 0.08 | 0.07 | 0.08 | 0.05 |
| Modulus, 1000 × psi | 407 | 344 | 351 | 313 | 298 | 313 |
| Fracture Test - Compact Tension, ASTM E-399 | | | | | | |
| $K_{IC}$, MN/m3/2 | 0.712 | 1.229 | 1.043 | 1.237 | 1.228 | 1.183 |
| $G_{IC}$, j/m2 | 159.68 | 618.81 | 398.27 | 625.94 | 648.53 | 573.34 |
| Heat Distortion, ASTM D-256 °C. at 264 psi | 122 | 117 | 119 | 113 | 132 | 117 |

EXAMPLES 31–34

In the following two examples, MCTA comb copolymers are evaluated as built-in tougheners by preparing elastomer-modified vinyl ester resins in a manner analogous to that described in U.S. Pat. No. 3,892,819 to Najvar. In the first step to form an epoxy adduct of MCTA, 175 gm of Epon 828, 11.7 gm of bisphenol, and 36.1 g of MCTA1 of Example 1 were reacted in the presence of 0.2 ml of 70 wt % of ethyltriphenylphosphonium acetate solution in methanol (obtained form Alfa Corporation) as a catalyst for 3 hr at 150° C. under nitrogen in a three-neck flask equipped with a mechanical stirrer, a condenser, and a nitrogen inlet. At the end of the reaction, the carboxy content of the mixture is 0.0002 Ephr. The second step of the reaction was carried in the same flask by adding 66.2 g of methacrylic acid, 0.17 g of hydroquinone, and 0.2 ml of 70 wt % of ethyltriphenylphosphonium acetate solution in methanol under air at 110° C. for 6 hr. The elastomer-modified vinyl ester resin has a Brookfield viscosity of 2125 cps at 22° C. and a carboxyl content of 0.0002 Ephr, which indicates the nearly complete In Examples 36 and 37, VER1 and VER2 (these were modified with 7.5 wt % and 12.5 wt % of MCTA1, respectively), were used.

In Examples 31 and 34, Derakanes 8084 and 411 obtained from Dow Chemical Co was used, respectively. Derakane 411 is untoughened vinyl ester resin containing no omer and Derakane 8084 is an elastomer-modified vinyl ester resin, believed to be made in a manner analogous to that taught for VER1, containing 7.5 wt % of CTBNX8.

The results of physical testings are set forth in Table X. The data in Example 31 of commercial Derakane 8084 show about a two-fold increase in the fracture energy $G_{IC}$ after incorporating a commercial CTBNX8 reactive polymer at 7.5 wt % into the unmodified vinyl ester resin Derakane 411 of Example 34 which is free of elastomer. The data in Example 33 show that the improvement of toughness as indicated by increasing the fracture energy of the cured resin by incorporating of MCTA1 of the present invention at 7.5 wt % is twice greater than that by incorporating commercial CTBNX8 as shown in Example 31 with the same elastomer content. The data in Example 33 show that the fracture energy is great than 1000 j/m2 when vinyl ester is modified with 12.5 wt % of MCTA1 of the present invention. The tensile strength, modular, and Tg of MCTA modified cured vinyl ester resin are comparable with those of commercial Derakane 8084 which is modified with CTBNX8.

TABLE X

Physical Props of MCTA Mod'f'd Vinyl Ester Resins - Prereacted

| | Example | | | |
|---|---|---|---|---|
| | 35 Derakane 8084 | 36 MCTA1 | 37 MCTA1 | 38 Derakane 411 |
| Elastomer, phr | 7.5 | 7.5 | 12.5 | 0 |
| PHYSICAL PROPERTIES: | | | | |
| Tensile, ASTM D-638 | | | | |
| Strength at Yield, psi | 8813 | 9647 | 8028 | 10507 |
| Elongation at Yield, % | 4.3 | 3.6 | 4.5 | 3.4 |
| Strength at Break, psi | 7883 | 9608 | 7666 | 10507 |
| Elongation at Break, % | 10.5 | 3.6 | 6.8 | 2.0 |
| Modulus, 1000 × psi | 407 | 419 | 388 | 460 |
| Flexural Test, ASTM D-790 | | | | |
| Strength, psi | 13290 | 14830 | 13930 | 15530 |
| Elongation, % | 0.06 | — | 0.04 | 0.05 |
| Modulus, 1000 × psi | 355 | 385 | 330 | 432 |
| Fracture Test - Compact Tension, ASTM E-399 | | | | |
| $K_{IC}$, MN/m3/2 | 1.071 | 1.66 | 1.77 | 0.810 |
| Glc, j/m2 | 415 | 914 | 1216 | 195 |
| Tg by DSC, °C. | 105 | 107 | 104 | 120 |
| TEM: Avg Particle size, μm | <1 | <1 | <1 | none |

EXAMPLE 35

In this example, MHTA (copolymer of butyl acrylate and macromer, with OH-terminated backbone) was obtained by copolymerizing BA and MPCL6 (MW=640) at 85/15 by wt ratio with hydrogen peroxide as the free-radical initiator. The polymerization was carried out in a 2 L jacketed glass Buchi reactor. In a beverage bottle, 72 g of MPCL was dissolved in 408 g of BA. Then the bottle was capped and the mixed monomer solution was purged with nitrogen. 480 g of MEK (methyl ethyl ketone) is charged to the reactor which was then evacuated until the MEK boiled, and then pressured to 30 psig with nitrogen. This protocol was repeated three times. The reactor was then heated. When the reactor temperature reached 125° C. 106 g of mixed monomer solution were added into the reactor followed by 40 g of hydrogen peroxide (35 wt % active, grade DS35 obtained from Chemprox Chemical Inc.). The remaining mixed monomers were then metered into the reactor over 4 hours while the reactor temperature was kept at 125°–130° C., at a pressure of 55 psi. After the completion of metering, the post polymerization was carried out for an additional hour with a total polymerization time of five hours. At the end of post polymerization, the reactor was cooled down. When the temperature was about 30° C. and the polymer solution was blown down to a one-gallon jar. A total solids of 48.1% corresponding to 100% conversion of monomers was obtained.

To the polymer solution 0.72 g of Irganox 1010 (antioxidant) was added. The polymer solution then was filtered and dried with a rotary evaporator under vacuum at 125° C. A total of 434 g of very light yellow clear liquid polymer corresponding to 91% yield was obtained. Some portions of polymer were lost during filtration, drying, and transferring. The polymer has Brookfield viscosity of 6,900 cps at 27° C.

I claim:

1. A reactive polymeric modifier to improve toughness and/or flexibility of a thermosetting resin comprising a polymer having a comb configuration including a saturated polymeric backbone having reactive groups selected from the group consisting of carboxyl, hydroxyl, amino, epoxy, vinyl and thio at each end and at least one pendent chain which is miscible with said thermosetting resin while it is uncured;

said backbone comprising a polymeric chain of carbon-carbon linkages which are polymers or copolymers of ethylenically unsaturated monomers free of olefinic unsaturation, having a glass transition temperature Tg of −100 ° C. to 25 ° C.;

said reactive groups being reactive with the thermosetting resin, being positioned on both ends of said backbone, and comprising, on average, at least 1.2 but less than 2 reactive groups positioned so as to yield a substantially difunctionalized comb;

said pendant chain or chains being linked to said backbone, being present in an amount of from 3% to 40% by weight of said comb copolymer, and having from 2 to 250 repeating units selected from the group consisting of polyester, polyether, polystyrene, and polymethacrylate; and, said comb polymer having a number average molecular weight of from 1,000 to 20,000.

2. The reactive modifier of claim 1 wherein said backbone is a homopolymer or copolymer of acrylate monomer, and, said each pendent chain is a polyester.

3. The reactive modifier of claim 2 wherein said reactive group is carboxyl.

4. The reactive modifier of claim 1 wherein said the backbone is homopolymer or copolymer of ethyl acrylate, n-butyl acrylate or 2-ethylhexyl acrylate; and said pendent chain is polycaprolactone.

5. The reactive modifier of claim 2 wherein said reactive comb copolymer has a number average molecular weight of 1,500 to 10,000; said acrylate is a $C_2$–$C_{18}$ alkyl acrylate; and said polyester is present of from 5% to 25% by weight and has from 2 to 100 repeating units selected from the group consisting of cyclic lactone having from 4 to 7 member ring.

6. The reactive modifier of claim 5 wherein said reactive comb copolymer has a number average molecular weight of 2,500 to 6,000; and said polyester has from 3 to 25 repeating units.

7. A comb copolymer having a saturated polymeric carbon-carbon backbone having reactive functional groups selected from the group consisting of carboxyl, hydroxyl, amino, epoxy, vinyl and thio at both ends and at least one pendent chain joined to said backbone, said backbone being free of olefinic unsaturation and said comb copolymer being formed by a process comprising, polymerizing in a substantially non-aqueous solvent at least one ethylenically unsaturated monomer of from 60% to 95% by weight for the backbone component and a macromonomer having an $\alpha,\beta$-unsaturated terminal head group of from 5% to 40% by weight for the pendent chain or chains in the presence of an effective amount of an initiator, in excess of 1 mole per 100 moles of the total amount of the monomers, for a free radical polymerization which provides terminal reactive groups at each end of the backbone, the number of said terminal reactive groups, on average, being at least 1.2 but less than 2; said macromonomer being selected from the group consisting of polyester, polyether, polystyrene, and polymethacrylate having between about 2 and 250 repeating units, and having $\alpha,\beta$-unsaturated terminal head group being selected from the group consisting of acrylic, allylic and a styrylic group;

said polymerization being carried out at a pressure of from about 1 atm to 10 atm, and a temperature of from 10° C. to about 150° C., for a period of time sufficient to form said comb copolymer; and, recovering said comb copolymer having a backbone component having a Tg in the range from –100° C. to 25 ° C., and the comb copolymer having a number average molecular weight in the range from 1,000 to about 20,000.

8. The comb copolymer of claim 7 wherein said elastomer backbone component is a homopolymer or copolymer of (i) at least one elastomeric monomer present in an amount of from 70–100 parts per 100 parts by weight of said backbone component, (ii) a rigid monomer present in an amount of from 0–60 parts per 100 parts by weight of said backbone component; and, (iii) a difunctional monomer present in an amount of from 0–10 parts per 100 parts by weight of said backbone component, said difunctional monomer being ethylenically unsaturated monomer having a terminal functional group at the other end.

9. The comb copolymer of claim 8 wherein said elastomeric monomer (i) is selected from the group consisting of ethyl acrylate, propyl acrylate, butyl acrylate, hexyl acrylate, 2-ethylbutyl acrylate, 2-ethylhexyl acrylate, dodecyl acrylate, octadecyl acrylate, ethoxyethyl acrylate, ethoxypropyl acrylate, ethoxybutyl acrylate, methoxyethyl acrylate, methoxypropyl acrylate, methoxybutyl acrylate, 2-(2-ethoxyethoxy) ethyl acrylate, 2,2'2-trifluoroethyl acrylate, ethylene, propylene, butylene, vinyl ethyl ether, vinyl propyl ether, vinyl butyl ether, and vinyl ethylhexyl ether;

said rigid monomer (ii) is selected from the group consisting of ethyl methacrylate, propyl methacrylate, butyl methacrylate, methyl methacrylate, styrene, alpha-methylstyrene, chlorostyrene, vinyl toluene, acrylonitrile, methacrylonitrile, vinyl chloride, vinyl acetate, vinylidene chloride, vinyl pyridine, and vinyl pyrrolidone; and, said difunctional monomer (iii) is selected from the group consisting of methacrylic acid, acrylic acid, dimer of acrylic acid, 2-hydroxyethyl methacrylate, hydroxypropyl methacrylate, 4-hydroxybutyl methacrylate, 2,3-dihydroxypropyl methacrylate, glycidyl methacrylate, 2-hydroxyethyl acrylate, hydroxypropyl acrylate, 4-hydroxybutyl acrylate, 2,3-dihydroxypropyl acrylate, glycidyl acrylate, allyl glycidyl ether, 2-thioethyl methacrylate, thiopropyl methacrylate, 4-thiobutyl methacrylate, 2,3-dithiopropyl methacrylate, 2-thioethyl acrylate, thiopropyl acrylate, 4-thiobutyl acrylate, 2,3-dithiopropyl acrylate, o,p-hydroxystyrene, o,p-hydroxymethylstyrene, o,p-chloromethylstyrene, o,p-hydroxy alphamethylstyrene, o,p-hydroxymethyl alpha-methylstyrene, 2-isocyanatoethyl acrylate and 2-isocyanatoethyl methacrylate;

said Tg is of the backbone component is from –80° C. to –20° C.;

said molecular weight of said comb is of from 1500 to about 10,000; and, said reaction is carried out at a pressure of from about 1 atm to 5 atm, and a temperature of from 40° C. to about 135° C.

10. The comb copolymer of claim 9 wherein said comb has an average functionality of said reactive groups at each end of said backbone, of from 1.5 to 2.0, and the pendent chain of said comb is selected from the group consisting of (A) polyester homopolymer, polyester random copolymer, or polyester block copolymer having repeating units of a cyclic ester selected from the group consisting of epsilon-caprolactone, delta-caprolactone, beta-propiolactone, beta-butyrolactone, and delta-valerolactone;

(B) polyether homopolymer, polyether random copolymer, or polyether block copolymer having repeating units of a cyclic ether selected from the group consisting of, propylene oxide, butylene oxide, oxetane, tetrahydrofuran, epichlorohydrin, epibromohydrin, ethyl glycidyl ether, propyl glycidyl ether, butyl glycidyl ether, ethylhexyl glycidyl ether;

(C) polystyrene homopolymer, polystyrene random copolymer, or polystyrene block copolymer having repeating units of a styrenic monomer selected from the group consisting of styrene, alpha-methylstyrene, vinyl toluene, and chlorostyrene; and, (D) polymethacrylate homopolymer, polymethacrylate random copolymer, or polymethacrylate block copolymer having repeating units selected from methyl methacrylate or butyl methacrylate.

11. The comb copolymer of claim 10 wherein said reactive functional groups at both ends of the backbone are selected from the group consisting of carboxyl, hydroxyl, epoxy, and thio and wherein said initiator is selected from the group consisting of 4,4'-azobis-(4-cyano-pentanoic acid), 4,4'-azobis-(4-cyano-2-methylpentanoic acid), 2,2'-azobis-(4-cyano-pentanoic acid), 2,2'-azobis-(2-methylpropanic acid), 2,2'-azobis-[2-(hydroxymethyl) propionitrile], 2,2'-azobis-{2-methyl-N-[1,1-bis(hydroxymethyl)]-2-hydroxyethyl]propionamide}.

12. The comb copolymer of claim 11 wherein said reactive functional groups at both ends of the backbone are carboxyl and wherein said initiator is 4,4'-azobis-(4-cyanopentanoic acid).

13. The comb copolymer of claim 10 wherein said reactive functional groups are carboxyl or hydroxyl, and are obtained by hydrolyzing the functional groups derived from an initiator selected from the group consisting of dimethyl 4,4'-azobis-(4-cyano-pentanate), diacetate ester of 2,2'-azobis-(4-methyl-2-pentanol), diacetate ester of 2,2'-azobis-(2-methyl-2-propanol), dimethyl 2,2'-azobis-( 2-methypropionate), diacetate ester of 2,2'-azobis-[2-(hydroxymethyl) propionitrile], 2,2'-azobis-[2-(trimethylsilyloxymethyl) propionitrile], and dimethyl 2,2'-azobis-(2-methylpropinate).

14. The reactive modifier of claim 10 wherein said backbone component is a homopolymer or copolymer of acrylate monomer and said each chain is a polyester.

15. The reactive modifier of claim 14 wherein said reactive comb copolymer has a number average molecular weight of 1,500 to 10,000; said the backbone component is derived from $C_2$–$C_{18}$ alkyl acrylate; and said pendent chain or chains are polyester and present of from 5% to 25% by weight and having from 2 to 100 repeating units selected from the group consisting of cyclic lactone having from 4 to 7 member ring.

16. The reactive modifier of claim 15 wherein said backbone is a homopolymer or copolymer of ethyl acrylate, n-butyl acrylate or 2-ethylhexyl acrylate; and said polyester is polycaprolactone.

17. The reactive modifier of claim 16 wherein said reactive comb copolymer has a number average molecular weight of 2,500 to 6,000; and said pendent chain or chains are polyester having from 3 to 25 repeating units.

18. A process for making a comb copolymer having a saturated polymeric carbon-carbon backbone having reactive functional groups selected from the group consisting of carboxyl, hydroxyl, amino, epoxy, vinyl and thio at both ends and at least one pendent chain joined to said backbone, said process comprising, polymerizing in a substantially non-aqueous solvent at least one ethylenically unsaturated monomer in an amount of from 60% to 95% by weight for the elastomeric backbone component and a macromonomer having an α,β-unsaturated terminal head group in an amount of from 5% to 40% by weight for the pendent chain or chains in the presence of an effective amount of an initiator in excess of 1 mole per 1 00 moles of the total amount of the monomers, for a free radical polymerization which provides terminal reactive groups at each end of the backbone; said macromonomer being selected from the group consisting of polyester, polyether, polystyrene, and polymethacrylate having between about 2 and 250 repeating units, and having α,β-unsaturated terminal head group being selected from the group consisting of acrylic, allylie and a styrylic group;

said polymerization being carried out at a pressure of from about 1 atm to 10 atm, and a temperature of from 10° C. to about 150 ° C., for a period of time sufficient to form said comb copolymer; and, recovering said comb copolymer having an elastomeric backbone component having a Tg of from −100 ° C. to 25 ° C., and the comb copolymer having a number average molecular weight of from 1,000 to about 20,000.

19. The process of claim 18 wherein said ethylenically unsaturated monomer or monomers are selected from the group consisting of (i) at least one elastomeric monomer present in an amount of from 70–100 parts per 100 parts of by weight of total ethylenically unsaturated monomer or monomers, (ii) optionally, a rigid monomer present in an amount of from 0–60 parts per 100 parts by weight of total ethylenically unsaturated monomer or monomers; and, (iii) optionally, a difunctional monomer present in an amount of from 0–10 parts per 100 parts by weight of total ethylenically unsaturated monomer or monomers, said difunctional monomer being ethylenically unsaturated monomer having a terminal reactive group.

20. The process of claim 19 wherein said elastomeric monomer (i) is selected from the group consisting of ethyl acrylate, propyl acrylate, butyl acrylate, hexyl acrylate, 2-ethylbutyl acrylate, 2-ethylhexyl acrylate, dodecyl acrylate, octadecyl acrylate, ethoxyethyl acrylate, ethoxypropyl acrylate, ethoxybutyl acrylate, methoxyethyl acrylate, methoxypropyl acrylate, methoxybutyl acrylate, 2-(2-ethoxyethoxy) ethyl acrylate, 2,2'2-trifluoroethyl acrylate, ethylene, propylene, butylene, vinyl ethyl ether, vinyl propyl ether, vinyl butyl ether, and vinyl ethylhexyl ether;

said rigid monomer (ii) is selected from the group consisting of ethyl methacrylate, propyl methacrylate, butyl methacrylate, methyl methacrylate, styrene, alpha-methylstyrene, chlorostyrene, vinyl toluene, acrylonitrile, methacrylonitrile, vinyl chloride, vinyl acetate, vinylidene chloride, vinyl pyridine, and vinyl pyrrolidone; and, said difunctional monomer (iii) is selected from the group consisting of methacrylic acid, acrylic acid, dimer of acrylic acid, 2-hydroxyethyl methacrylate, hydroxypropyl methacrylate, 4-hydroxybutyl methacrylate, 2,3-dihydroxypropyl methacrylate, glycidyl methacrylate, 2-hydroxyethyl acrylate, hydroxypropyl acrylate, 4-hydroxybutyl acrylate, 2,3-dihydroxypropyl acrylate, glycidyl acrylate, allyl glycidyl ether, 2-thioethyl methacrylate, thiopropyl methacrylate, 4-thiobutyl methacrylate, 2,3-dithiopropyl methacrylate, 2-thioethyl acrylate, thiopropyl acrylate, 4-thiobutyl acrylate, 2,3-dithiopropyl acrylate, o,p-hydroxystyrene, o,p-hydroxymethylstyrene, o,p-chloromethylstyrene, o,p-hydroxy alphamethylstyrene, o,p-hydroxymethyl alphamethylstyrene, 2-isocyanatoethyl acrylate and 2-isocyanatoethyl methacrylate;

said reaction is carried out at a pressure of from about 1 atm to 5 atm, and a temperature of from 40° C. to about 135° C.

21. The process of claim 20 wherein said the macromer is selected from the group consisting of (A) polyester homopolymer, polyester random copolymer, or polyester block copolymer comprising repeating units of a cyclic ester selected from the group consisting of epsilon-caprolactone, delta-caprolactone, beta-propiolactone, beta-butyrolactone, and delta-valerolactone;

(B) polyether homopolymer, polyether random copolymer, or polyether block copolymer having repeating units of a cyclic ether selected from the group consisting of, propylene oxide, butylene oxide, oxetane, tetrahydrofuran, epichlorohydrin, epibromohydrin, ethyl glycidyl ether, propyl glycidyl ether, butyl glycidyl ether, ethylhexyl glycidyl ether;

(C) polystyrene homopolymer, polystyrene random copolymer, or polystyrene block copolymer having repeating units of a styrenic monomer selected from the group consisting of styrene, alpha-methylstyrene, vinyl toluene, and chlorostyrene; and, (D) polymethacrylate homopolymer, polymethacrylate random copolymer, or polymethacrylate block copolymer having repeating units selected from methyl methacrylate or butyl methacrylate.

22. The process of claim 21 wherein said reactive functional groups at both ends of the backbone are selected from the group consisting of carboxyl and hydroxyl, and obtained by hydrolyzing the functional groups derived from an initiator selected from the group consisting of dimethyl 4,4'-azobis-(4-cyano-pentanate), diacetate ester of 2,2'-azobis-(4-methyl-2-pentanol), diacetate ester of 2,2'-azobis-(2-methyl-2-propanol), dimethyl 2,2'-azobis-(2-methypropionate), diacetate ester of 2,2'-azobis-[2-(hydroxymethyl) propionitrile], 2,2'-azobis-[2-(trimethylsilyloxymethyl) propionitrile], and dimethyl 2,2'-azobis-(2-methylpropionate).

23. The process of claim 21 wherein said reactive functional groups at both ends of the backbone are selected from the group consisting of carboxyl, hydroxyl, epoxy, and thio derived from an initiator selected from the group consisting of 4,4'-azobis-(4-cyano-pentanoic acid), 4,4'-azobis-(4-cyano-2-methylpentanoic acid), 2,2'-azobis-(4-cyano-pentanoic acid), 2,2'-azobis-(2methylpropanic acid), 2,2'-azobis-[2-(hydroxymethyl) propionitrile], 2,2'-azobis-{2-methyl-N-[1,1-bis(hydroxymethyl)] -2-hydroxyethyl] propionamide}.

24. The process of claim 23 wherein said reactive functional groups at both ends of the backbone are carboxyl derived from 4,4'-azobis-(4-cyano-pentanoic acid).

25. The process of claim 21 wherein said ethylenically unsaturated monomer is acrylate monomer, and, said macromer is a polyester.

26. The process of claim 25 wherein said reactive comb copolymer obtained has a number average molecular weight of 1,500 to 10,000; said ethylenically unsaturated monomer is selected from the group consisting of $C_2$–$C_{18}$ alkyl acrylate; and said macromer is polyester present of from 5% to 25% by weight and having from 2 to 100 repeating units selected from the group consisting of cyclic lactone having from 4 to 7 member ring.

27. The process of claim 26 wherein said ethylenically unsaturated monomer is selected from the group consisting of ethyl acrylate, n-butyl acrylate or 2-ethylhexyl acrylate; said macromer is polycaprolactone; and said initiator is 4,4'-azobis-(4-cyano-pentanoic acid).

28. The process of claim 27 wherein said reactive comb copolymer obtained has a number average molecular weight of 2,500 to 6,000; and said macromer of polycaprolactone having from 3 to 25 repeating units.

* * * * *